(12) United States Patent
Saito

(10) Patent No.: US 7,818,782 B2
(45) Date of Patent: Oct. 19, 2010

(54) AUTHENTICATION MEDIUM, AUTHENTICABLE SUBSTRATE, AUTHENTICATION MEDIUM LABEL, AUTHENTICATION MEDIUM TRANSFER SHEET, AUTHENTICABLE SHEET, AND AUTHENTICABLE INFORMATION RECORDING MEDIUM

(75) Inventor: Tae Saito, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 948 days.

(21) Appl. No.: 10/599,984

(22) PCT Filed: Apr. 11, 2005

(86) PCT No.: PCT/JP2005/007358

§ 371 (c)(1),
(2), (4) Date: Oct. 16, 2006

(87) PCT Pub. No.: WO2005/101069

PCT Pub. Date: Oct. 27, 2005

(65) Prior Publication Data

US 2008/0282322 A1    Nov. 13, 2008

(30) Foreign Application Priority Data

Apr. 14, 2004  (JP)  ............... 2004-119442
Apr. 15, 2004  (JP)  ............... 2004-119844
Aug. 17, 2004  (JP)  ............... 2004-237194

(51) Int. Cl.
H04L 9/32    (2006.01)
G09C 3/00    (2006.01)
G06F 7/04    (2006.01)

(52) U.S. Cl. ............... 726/2; 726/27; 726/28; 726/29; 726/30; 380/54
(58) Field of Classification Search ............... 726/2
See application file for complete search history.

(56) References Cited

U.S. PATENT DOCUMENTS 6,061,122 A * 5/2000 Hoshino et al. ............... 356/71
2003/0085380 A1 * 5/2003 Schuhmacher et al. ... 252/299.7

FOREIGN PATENT DOCUMENTS

| JP | 2000-255200 A | 9/2000 |
| JP | 2002-537149 A | 11/2002 |
| JP | 2003-161835 A | 6/2003 |
| JP | 2003-1618835 | * 6/2003 |
| JP | 2004-338257 A | 12/2004 |
| WO | WO 00/13065 A1 | 9/2000 |

* cited by examiner

*Primary Examiner*—Longbit Chai
(74) *Attorney, Agent, or Firm*—Sughrue Mion, PLLC

(57) ABSTRACT

The invention relates to an authentication medium capable of eliminating problems with the formation of an authentication portion with and embossed hologram, for instance, difficulty with which fabrication time is cut down, and difficulty with which an authentication pattern is changed due to an increased step counts at the time of embossing mold fabrication. A thin-film layer (2) made up of a material that changes in transmittance of reflectance upon heating, an orientation film (4) that is provided if necessary, and a color change layer (3) such a light selective reflecting layer comprising a cholesteric liquid crystal layer are stacked on a substrate (12). By means of a thermal head or the like, recording is applied to the thin-film layer (2), and changes in the hue of the light selective reflecting layer (3) at a recorded site or the presence or absence of reflection or hues upon observation by way of a circular polarization sheet are observed, thereby solving the above problems.

18 Claims, 9 Drawing Sheets

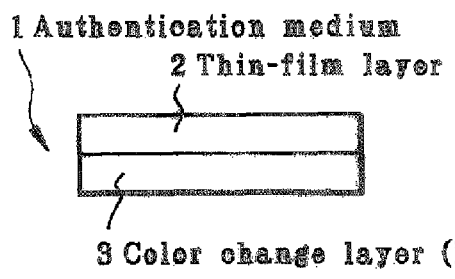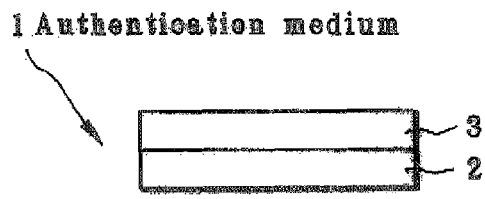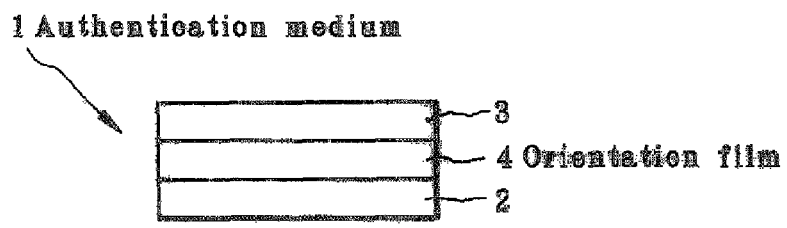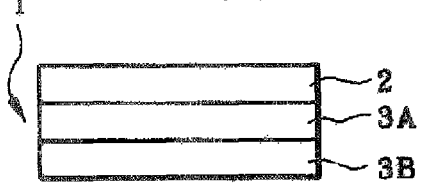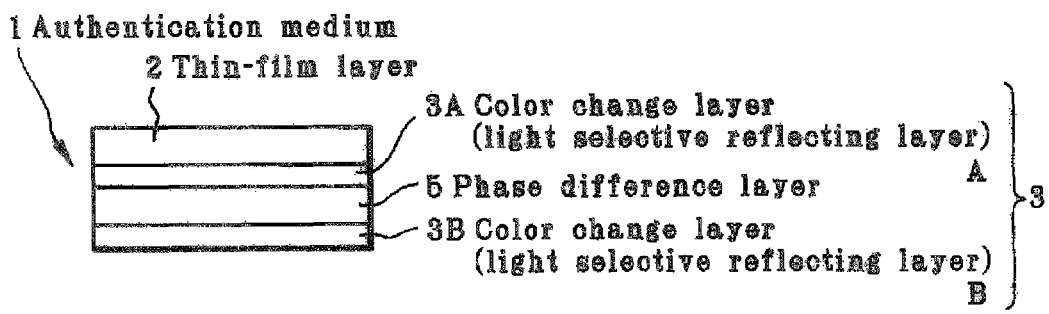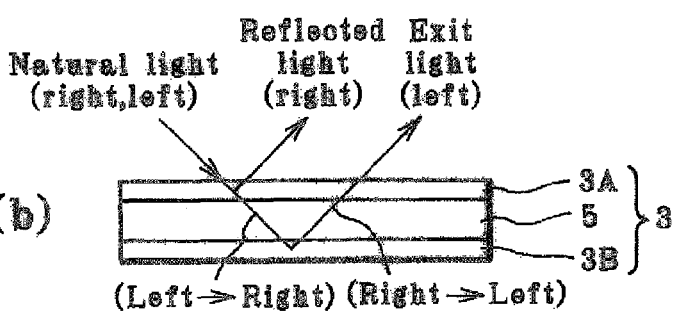

FIG. 10

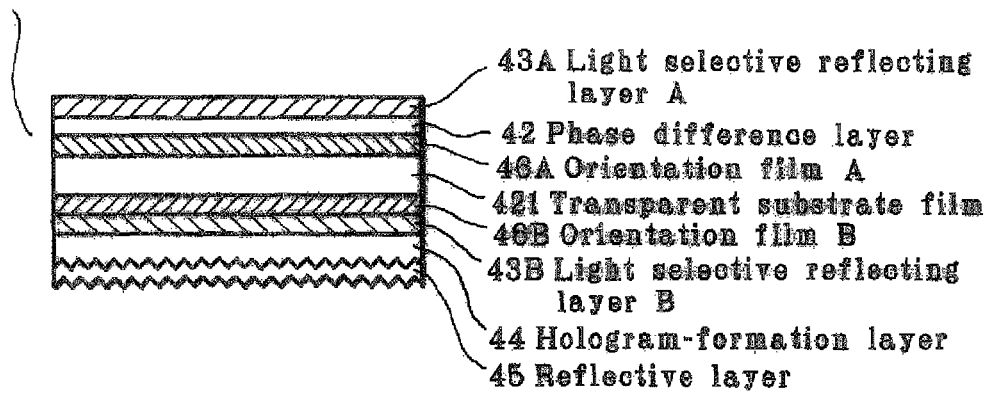

41 Authentication medium
- 43A Light selective reflecting layer A
- 42 Phase difference layer
- 46A Orientation film A
- 421 Transparent substrate film
- 46B Orientation film B
- 43B Light selective reflecting layer B
- 44 Hologram-formation layer
- 45 Reflective layer

FIG. 11(a)

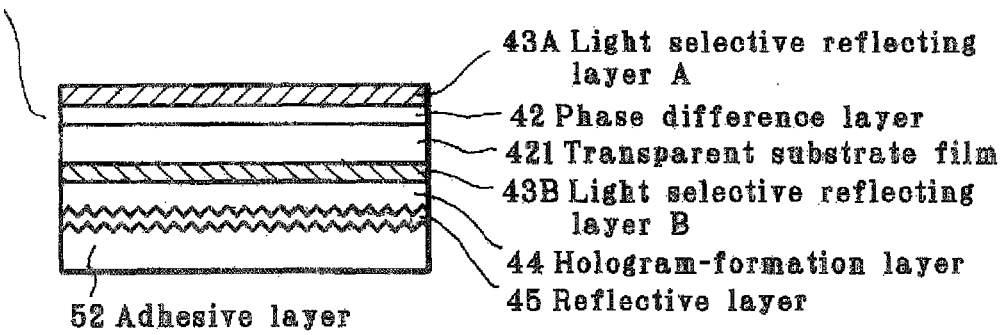

51 Authentication medium label
- 43A Light selective reflecting layer A
- 42 Phase difference layer
- 421 Transparent substrate film
- 43B Light selective reflecting layer B
- 44 Hologram-formation layer
- 45 Reflective layer
- 52 Adhesive layer

FIG. 11(b)

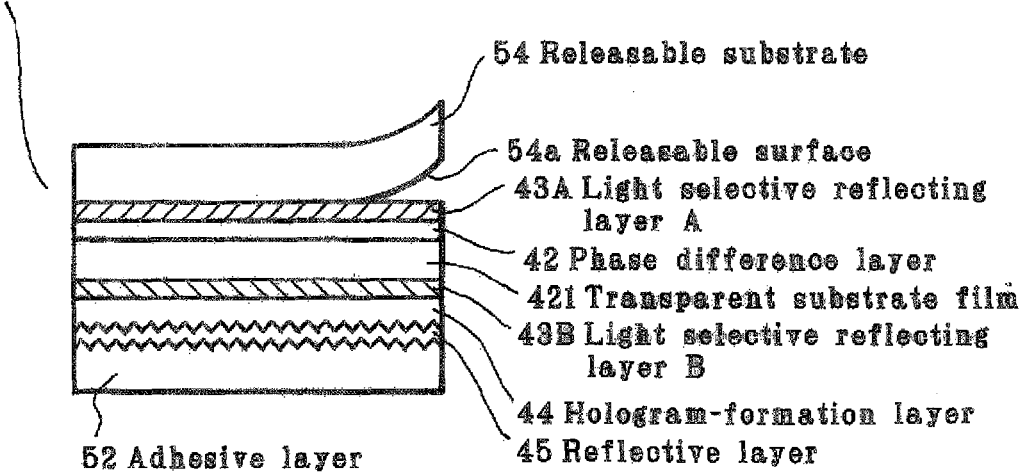

53 Authentication medium transfer sheet
- 54 Releasable substrate
- 54a Releasable surface
- 43A Light selective reflecting layer A
- 42 Phase difference layer
- 421 Transparent substrate film
- 43B Light selective reflecting layer B
- 44 Hologram-formation layer
- 45 Reflective layer
- 52 Adhesive layer FIG. 13(a)
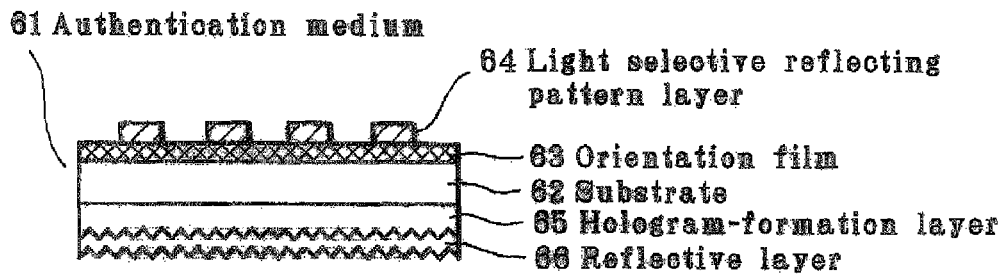
FIG. 13(b)
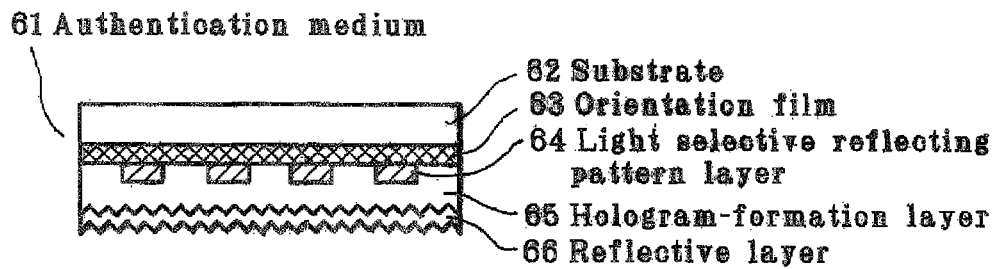
FIG. 14(b)
FIG. 14(a)
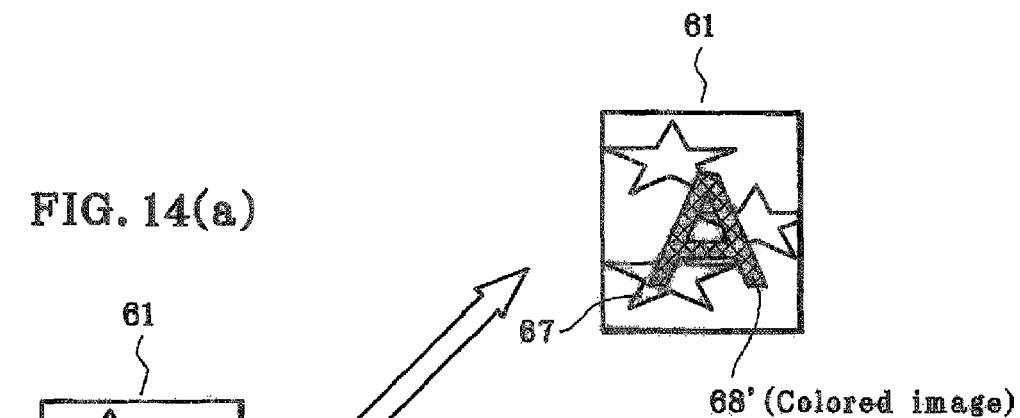
FIG. 14(c)
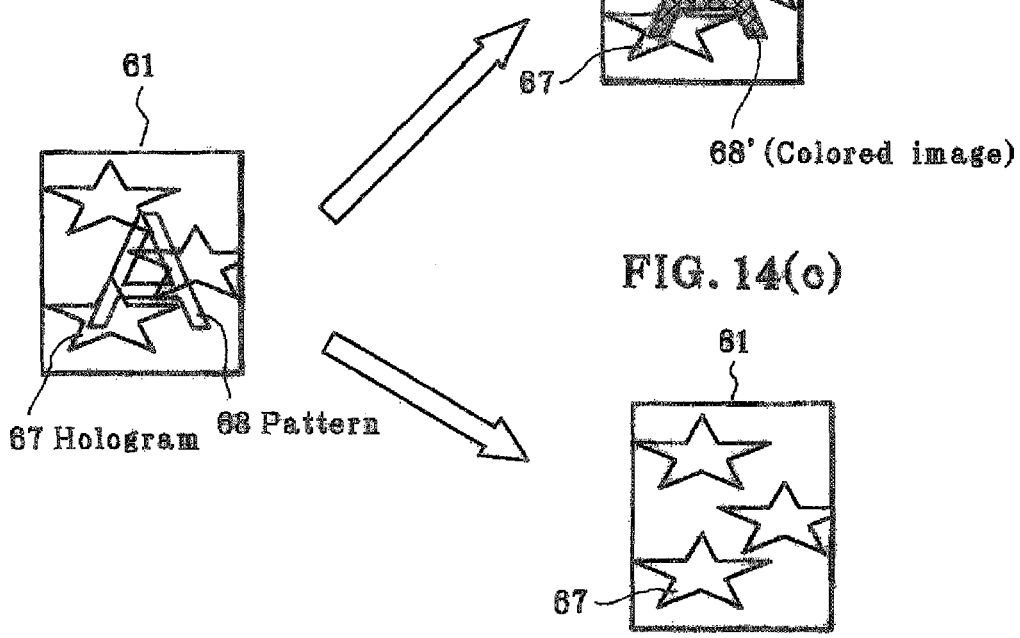

FIG. 15(a)

71 Authentication medium label

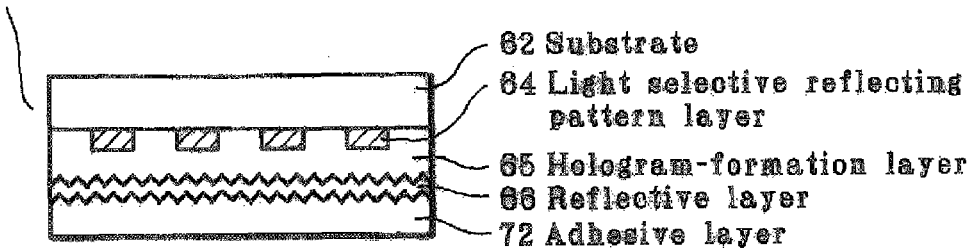

- 62 Substrate
- 64 Light selective reflecting pattern layer
- 65 Hologram-formation layer
- 66 Reflective layer
- 72 Adhesive layer

FIG. 15(b)

73 Authentication medium transfer sheet

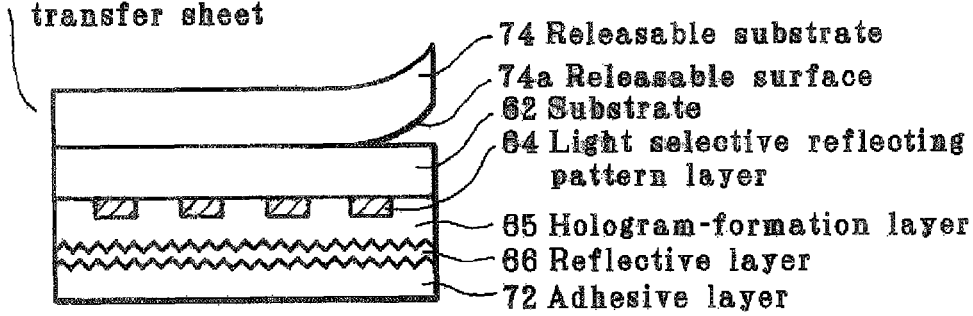

- 74 Releasable substrate
- 74a Releasable surface
- 62 Substrate
- 64 Light selective reflecting pattern layer
- 65 Hologram-formation layer
- 66 Reflective layer
- 72 Adhesive layer

FIG. 16(a)

75 Authenticable information recording medium

77 Information

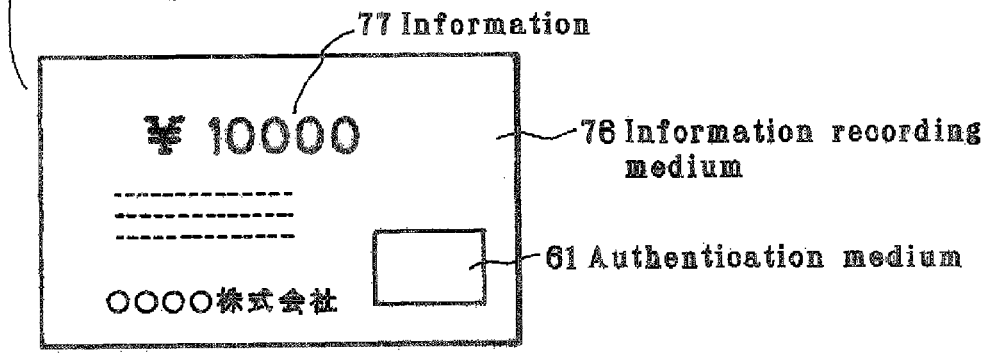

- 76 Information recording medium
- 61 Authentication medium

FIG. 16(b)

79 Recess

78 Authenticable sheet

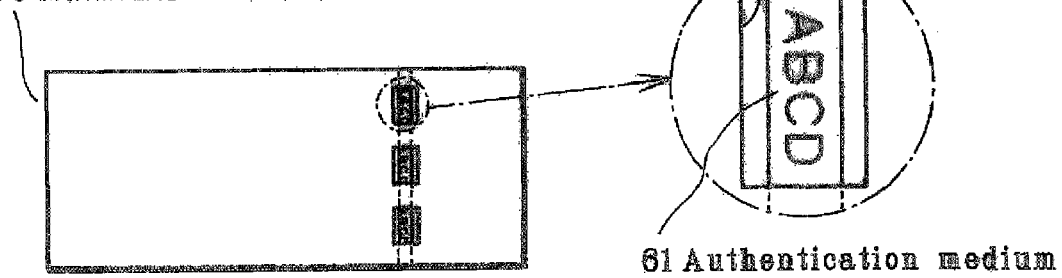

61 Authentication medium

AUTHENTICATION MEDIUM, AUTHENTICABLE SUBSTRATE, AUTHENTICATION MEDIUM LABEL, AUTHENTICATION MEDIUM TRANSFER SHEET, AUTHENTICABLE SHEET, AND AUTHENTICABLE INFORMATION RECORDING MEDIUM

ART FIELD

The present invention relates to an authentication medium that can tell from what is obtained from it by illegal copying, doctoring, etc. The present invention also relates to an authenticable substrate with an authentication medium applied to it. Further, the present invention relates to configuring or otherwise processing such an authentication medium into a label or transfer sheet form suited for use on articles or objects. Furthermore, the present invention relates to a sheet or information recording medium to which the authentication medium is applied.

BACKGROUND ART

For instance, credit cards, bank cards, tradable coupons, and ID cards, all likely to incur hassles when illegally copied, doctored and used, should desirously have an authentication function by themselves. In addition, for instance, wristwatches, leather goods, upscale objects such as noble metal goods and jewelry, especially those called upscale brand products, audios, electric appliances, and music, image, game or computer software recorded in media which used to be illegally copied, too, should desirously have an authentication function by themselves.

So far, much use has been made of holograms for the purpose of authenticating various objects including the above goods or articles, primarily because of a sophisticated structure and, hence, difficulty of fabrication. However, how to fabricate holograms has been known to experts in the art, and it is still fairly difficult to tell genuine holograms from false ones because of sophistication.

As a hologram substitute, therefore, it has been proposed to use an authentication medium comprising a substrate, a light selective reflecting layer that is provided on one surface of the substrate and capable of selectively reflecting only one of left-handed or right-handed circularly polarized light of incident light, and an authentication segment that is formed on at least a part of the light selective reflecting layer and has authentication information (for instance, see patent publication 1).

Patent Publication 1

JP(A) 2000-25373 (pages 3-5, FIG. 1)

The authentication set forth in patent publication 1 still makes use of an authentication segment made up of an embossed hologram and so allows a precise pattern to be formed as an authentication segment; however, the time of contact of an embossing mold with the material to be embossed must be long enough to fully reproduce a hologram pattern embossed in the embossing mold. Thus, it is difficult to cut down fabrication time, and an increased step counts for the embossing mold itself works against alteration of the pattern at the authentication segment.

DISCLOSURE OF THE INVENTION

The present invention has for its object the provision of an authentication medium that can eliminate problems with the formation of an authentication segment from an embossed hologram such as difficulty in cutting down fabrication time, an increased step counts at the time of making embossing molds, and difficulty in alteration of an authentication segment pattern.

It has now been found that the above object is achievable by the stacking of a metal thin film, etc. that can melt or evaporate upon heating to make a pattern, and a light selective reflecting layer or other color change layer such as a cholesteric liquid crystal layer that is able to selectively reflect either one of left-handed or right-handed circularly polarized light of incident light. Such findings have underlain the present invention.

It has also been found that the above object of the present invention is achievable by use of a multilayer structure, optionally in combination with a hologram or the like, in which cholesteric liquid crystal layers that change in hue between on viewing through a right-handed circularly polarizing sheet put over them and on viewing through a left-handed circularly polarizing sheet put over them are stacked together with a phase difference layer interleaved between them. Such findings have underlain the present invention.

Further, it has been found that the above object of the present invention is achievable by the pattern-wise formation of a light selective reflecting layer made up of, for instance, cholesteric liquid crystals and the location of a hologram on its back side. Such findings have underlain the present invention.

The first invention is directed to an authentication medium, characterized by comprising a multilayer structure in which two light selective reflecting layer are stacked together with a phase difference layer interleaved there-between, wherein said two light selective reflecting layers are each formed of a material capable of selectively reflecting either one of left-handed or right-handed circularly polarized light of incident light, and center wavelengths of light reflected off said two light selective reflecting layers differ from each other.

The second invention is directed to the authentication medium according to the first invention, characterized in that said phase difference layer is a transparent substrate film.

The third invention is directed to the authentication medium according to the first invention, characterized in that said phase difference layer is a multilayer structure that comprises a transparent film and a nematic liquid crystal layer.

The fourth invention is directed to the authentication medium according to any one of the $1^{st}$ to the $3^{rd}$ inventions, characterized in that a light diffracting structure layer is stacked on one surface of said multilayer structure.

The fifth invention is directed to the authentication medium according to the $4^{th}$ invention, characterized in that said light diffracting structure layer is a reflection hologram.

The sixth invention is directed to the authentication medium according to the $4^{th}$ or the $5^{th}$ invention, characterized in that said light diffracting structure layer has a light reflective layer in association therewith.

The seventh invention is directed to an authentication medium label, characterized in that an adhesive layer is further stacked on an authentication medium according to any one of the $1^{st}$ to the $6^{th}$ inventions.

The eighth invention is directed to an authentication medium transfer sheet, characterized in that an authentication medium according to any one of the $1^{st}$ to the $6^{th}$ inventions is stacked on a releasable surface of a releasable substrate.

The ninth invention is directed to an authenticable sheet, characterized by having the authentication medium according to any one of the $1^{st}$ to the $6^{th}$ inventions on a part thereof in a visible way.

The 10th invention is directed to an authenticable information recording medium, characterized in that the authentication medium according to any one of the 1st to the 6th inventions is stacked on a surface of an information recording medium to be authenticated, or said information recording medium has the authentication medium according to any one of the 1st to the 6th inventions on a part thereof in a visible way.

The 11th invention is directed to an authentication medium, characterized in that at least two layers, or a thin-film layer that changes in transmittance or reflectance upon heating and a color change layer that differs in color depending on an angle of viewing are stacked together.

The 12th invention is directed to the authentication medium according to the 11th invention, characterized in that said color change layer is a light selective reflecting layer capable of selectively reflecting either one of left-handed or right-handed circularly polarized light of incident light.

The 13th invention is directed to the authentication medium according to the 12th invention, characterized in that said light selective reflecting layer comprises a cholesteric liquid crystal layer.

The 14th invention is directed to the authentication medium according to any one of the 11th to the 13th inventions, characterized in that said color change layer comprises two or more layers.

The 15th invention is directed to the authentication medium according to any one of the 11th to the 13th inventions, characterized in that said color change layer comprises two layers, between which there is a phase difference layer interleaved.

The 16th invention is directed to an authenticable medium, characterized in that a substrate has the authentication medium according to any one of the 11th to the 15th inventions on a part thereof in a visible way.

The 17th invention is directed to an authentication medium label, characterized in that an adhesive layer is further stacked on the authentication medium according to any one of the 11th to the 15th inventions.

The 18th invention is directed to an authentication medium transfer sheet, characterized in that the authentication medium according to any one of the 11th to the 15th inventions is stacked on a releasable surface of a releasable substrate.

The 19th invention is directed to an authentication medium, characterized in that a light selective reflecting pattern layer made up of a layer of a material capable of selectively reflecting either one of left-handed or right-handed circularly polarized light of incident light and a light diffracting structure layer are stacked together.

The 20th invention is directed to the authentication medium according to the 19th invention, characterized in that said light selective reflecting pattern layer is stacked on one surface side of a transparent substrate, and said light diffracting structure layer is stacked on another side surface of said transparent substrate.

The 21st invention is directed to the authentication medium according to the 19th invention, characterized in that said light selective reflecting pattern layer and said light diffracting structure layer are stacked in this order on one surface side of a transparent substrate.

The 22nd invention is directed to the authentication medium according to any one of the 19th to the 21st inventions, characterized in that said light diffracting structure layer is a reflection hologram.

The 23rd invention is directed to the authentication medium according to any one of the 19th to the 22nd inventions, characterized in that said light diffracting structure layer has a light reflective layer in association therewith.

The 24th invention is directed to an authentication medium label, characterized in that an adhesive layer is further stacked on the authentication medium according to any one of the 19th to the 23rd inventions.

The 25th invention is directed to an authentication medium transfer sheet, characterized in that the authentication medium according to any one of the 19th to the 23rd inventions is stacked on a releasable surface of a releasable substrate.

The 26th invention is directed to an authenticable sheet, characterized by having the authentication medium according to any one of the 19th to the 23rd inventions on a part thereof in a visible way.

The 27th invention is directed to an authenticable information recording medium, characterized in that the authentication medium according to any one of the 19th to the 23rd inventions is stacked on a surface of an information recording medium to be authenticated, or said information recording medium has the authentication medium according to any one of the 19th to the 23rd inventions on a part thereof in a visible way.

According to the 1st invention, as the multilayer structure comprising two light selective reflecting, layers differing in the wavelength of reflected light, between which a phase difference-providing layer is interleaved, is irradiated with right-handed or left-handed circularly polarized light, it allows either one of the two light selective reflecting layers differing in the wavelength of reflected light to trigger reflection in a different color, making sure double-check authentication. In addition, that light selective reflecting layer is so transparent that even when put over another object, that another object can be seen through.

In addition to the advantage of the 1st invention, the 2nd invention has another advantage of providing an easy-to-form authentication medium, because a transparent substrate film is used as the phase difference-providing layer so that the light selective reflecting layer can be stacked on each side of the transparent substrate film.

In addition to the advantage of the 1st invention, the 3rd invention has another advantage of providing an easy-to-form authentication medium, because a transparent substrate film with a nematic liquid crystal layer stacked on it is used as the phase difference-providing layer so that the light selective reflecting layer can be stacked on each side of the transparent substrate film.

In addition to the advantages of the 1st to the 3rd inventions, the 4th invention has another advantage of providing an authentication medium wherein the light diffracting structure layer is provided as a lower layer so that the light diffracting structure of the light diffracting structure layer, for instance, a hologram or diffraction grating is kept against a visibility drop.

In addition to the advantage of the 1st invention, the 5th invention has another advantage of providing an authentication medium that has an excellent appearance of the hologram.

In addition to the advantage of the 5th invention, the 6th invention has another advantage of providing an authentication member wherein the visibility of the hologram is more enhanced by the reflective layer that the hologram has.

According to the 7th invention, the authentication medium having the advantages of any one of the 1st to the 6th inventions is configured or otherwise processed into an authentication medium label applicable readily to articles, using an adhesive layer.

According to the 8th invention, the authentication medium able to possess the advantages of any one of the 1st to the 6th inventions is built up in a transferable way so that an authentication medium transfer sheet applicable readily to articles can be provided.

According to the 9th invention, there can be authenticable sheet provided, wherein the authentication medium of any one of the 1st to the 6th inventions makes the authentication of information added possible.

According to the 10th invention, there can be an authenticable information recording medium provided, wherein the authentication medium of any one of the 1st to the 6th inventions makes sure provision of an authenticable information recording medium that can be authenticated by itself.

According to the 11th invention, there can be authentication medium provided, which makes authentication possible by the visual observation of a hue differing depending on the angle of viewing on the basis of the color change layer at a site where a pattern based on a light transmittance or reflectance difference is formed on the thin-film layer.

In addition to the advantages of the 11th invention, the 12th invention can provide an authentication medium that makes surer authentication by the visual observation of a hue differing depending on the angle of viewing on the basis of the color change layer at a site where a pattern based on a light transmittance or reflectance difference is formed on the thin-film layer, and the visual observation of the presence or absence or the hue of reflected light through a left-handed or right-handed circularly polarizing sheet.

In addition to the advantages of any one of the 11th to the 13th inventions, the 14th invention can provide an authentication medium that can bring about more complicated hue changes depending on the angle of viewing.

In addition to the advantages of any one of the 11th to the 13th inventions, the 15th invention can provide an authentication medium that makes surer authentication, because two color change layers with a phase difference layer interleaved between them bring about more complicated reflection.

According to the 16th invention, there can be authenticable substrate provided, wherein the authentication medium of any one of the 11th to the 15th inventions makes the authentication of information added possible.

According to the 17th invention, there can be an authentication medium label applicable readily to articles provided, because the adhesive layer is stacked on the authentication medium of any one of the 11th to the 15th inventions.

According to the 18th invention, there can be an authentication transfer sheet applicable readily to articles, wherein the authentication medium able to possess the advantages of any one of the 11th to the 15th inventions is stacked on the releasable substrate.

According to the 19th invention, there can be an authentication medium provided, which has not only a light diffracting structure layer having a unique appearance resulting from light diffraction, but also a light selective reflecting pattern layer that takes usually on a latent image form but is visualized upon irradiation with left-handed or right-handed circularly polarized light, so that authentication is disabling in a normal state but irradiation with left-handed or right-handed circularly polarized light makes authentication feasible. The light selective reflecting pattern may be formed as by printing, so there is no increase in the number of process steps with easy pattern alterations.

In addition to the advantages of the 19th invention, the 20th invention can provide an authentication medium, wherein the light selective reflecting pattern layer and the light diffracting structure layer have no or little influence on each other upon their formation, because the substrate is interleaved between them.

In addition to the advantages of the 19th invention, the 21st invention can provide an authentication medium that may make use of an exposed substrate as a protective layer, because the respective layers are stacked on one surface side alone of the substrate.

In addition to the advantages of any one of the 19th to the 21st inventions, the 22nd invention can provide an authentication medium that makes a hologram image viewable.

In addition to the advantages of any one of the 19th to the 22nd inventions, the 23rd invention can provide an authentication medium in which the visibility of the appearance that the light diffracting structure layer has is improved, because the light diffracting structure layer has a light reflective layer in association with it.

According to the 24th invention, there can be an authentication medium label provided, which enables the authentication medium able to possess the advantages of any one of the 19th to the 23rd inventions to be readily applicable to an article using an adhesive layer.

According to the 25th invention, there can be an authentication medium transfer sheet provided, which is readily applicable to an article, because the authentication medium able to possess the advantages of any one of the 19th to the 23rd inventions is built up in a transferable way.

According to the 26th invention, there can be authenticable sheet provided, wherein the authentication medium of any one of the 19th to the 23rd inventions makes the authentication of information added possible.

According to the 27th invention, there can be an authenticable information recording medium provided, which is authenticable by itself, because the authentication medium of any one of the 19th to the 23rd inventions is provided.

BRIEF DESCRIPTION OF THE DRAWINGS

FIG. 1 is illustrative of one basic multilayer structure of the authentication medium of the present invention.

FIG. 2 is illustrative of another multilayer structure of the authentication medium of the present invention.

FIG. 10 is illustrative of the multilayer structure of an authentication medium according to another embodiment of the present invention.

FIG. 11 is illustrative of a label and a transfer sheet suitable for application of another authentication medium of the present invention to various articles.

FIG. 13 is illustrative of the multilayer structure of yet another authentication medium according to the present invention.

FIG. 14 is illustrative of how to implement authentication, using yet another authentication medium of the present invention.

FIG. 15 is illustrative of a label and a transfer sheet suitable for application of yet another authentication medium of the present invention to various articles.

FIG. 16 is illustrative of an example of application of yet another authentication medium according to the present invention.

BEST MODE FOR CARRYING OUT THE INVENTION

Figure 5A:
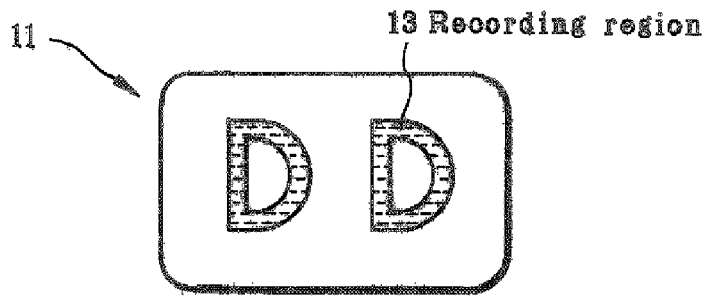
FIG. 5 is illustrative of how to implement authentication with the authentication medium of the present invention.
Figure 6:
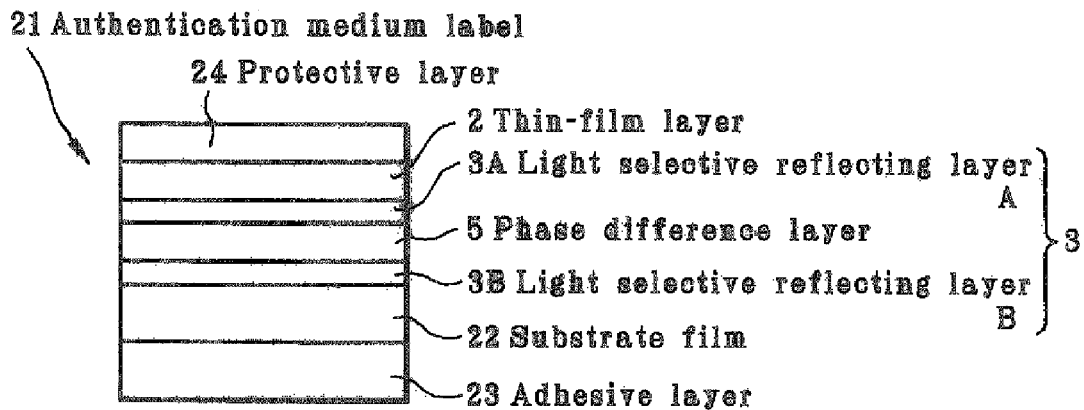
FIG. 6 is illustrative of a label form of authentication medium of the present invention.
Figure 7:
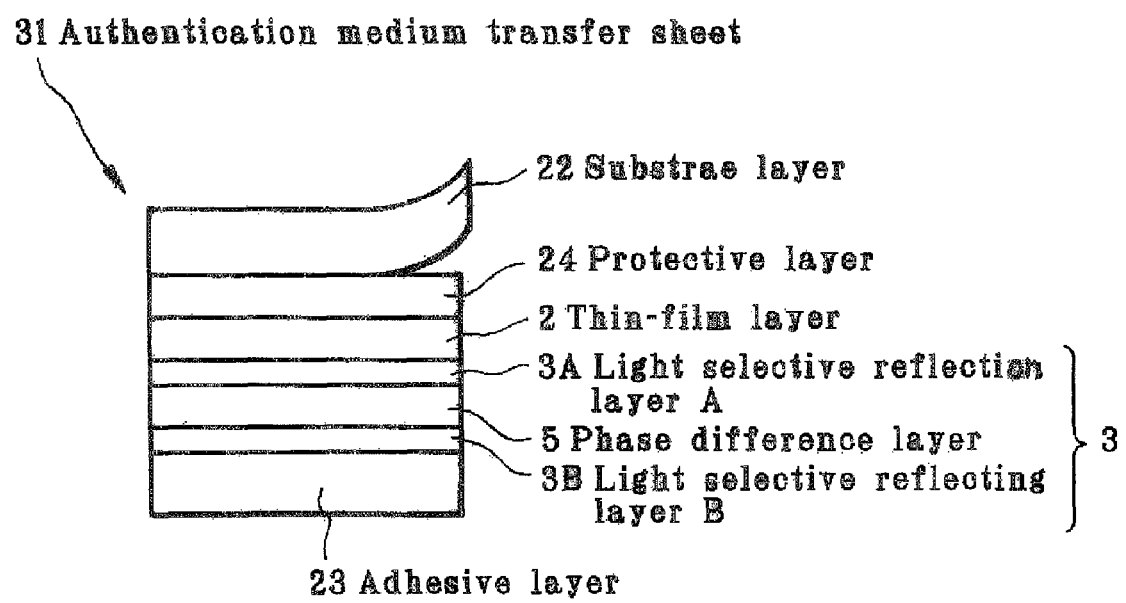
FIG. 7 is illustrative of a transfer sheet form of authentication medium of the present invention.

FIGS. 1 and 2 are each illustrative of the multilayer structure of the authentication medium of the present invention. FIGS. 3 and 4 are illustrative of exemplary applications of the authentication medium of the present invention. FIG. 5 is illustrative of how authentication is implemented with a product with the authentication medium of the present invention applied to it. FIG. 6 is illustrative of a label form of authentication medium of the present invention which is suitable for use on an application member. FIG. 7 is illustrative of a transfer sheet form of authentication medium of the present invention which is suitable for use on an application member.

Most basically, an authentication medium 1 of the present invention comprises a multilayer structure in which a thin-film layer 2 that changes in light transmittance or reflectance upon heating is stacked on a color change layer 3 that changes in color depending of an angle of viewing, as depicted in FIG. 1(a). Here, if the upper portion of the drawing sheet is taken as a viewing side, the authentication medium 1 may have a multilayer structure with the color change layer 3 stacked on the thin-film layer 2, as depicted in FIG. 1(b).

The color change layer 3 may be formed of a variety of materials; for instance, it may be formed using a pigment that changes in color depending on the angle of viewing, a vapor deposited thin film or a dichromatic dye. An example of the pigment that changes in color depending on the angle of viewing is a pearl pigment in which a layer formed of silicon oxide, titanium oxide, iron oxide or the like, each having a high refractive index and a layer formed of mica or the like having a low refractive index are stacked together. Specifically, Infinite Color made by Shiseido Co., Ltd. and Iriodin made by Merck (Germany) are available. Vapor deposited thin films are formed of metals inclusive of aluminum or other materials by means of vapor phase processes. A very thin vapor deposited film is of transparency and gives out the so-called interference color changing dependent on the angle of viewing just as an oil thin film on the surface of water. A dichromatic dye comprises a long-chain dye molecule differing in light absorbance depending on a molecular axis and, for instance, has the nature that a light component in a normal direction to the molecular axis is substantially not absorbed or transmitted, whereas a light component in a direction parallel with the molecular axis is absorbed or not transmitted. Exemplary dichromatic dyes are anthraquinone, azo or bisazo-based dyes. Regarding the pigments that change in color depending on the angle of viewing and the dichromatic dyes of those materials, each may be dispersed in a suitable binder resin and diluted with a solvent into a coating composition. Then, the coating composition may be applied to the surface of an application member by beans of silk screen printing, gravure printing or other known coating techniques.

The color change layer 3 that forms a part of the authentication medium may be a light selective reflecting layer able to selectively reflect either left-handed or right-handed circularly polarized light of incident light. In that case, the authentication medium 1 may comprise a multilayer structure that has additionally an orientation film 4 between the color change layer 3 and the thin-film layer 2, as depicted in FIG. 1(c). Alternatively, although not shown, the authentication medium 1 may comprise a multilayer structure formed of, in order from below, the light selective reflecting layer 3, the orientation layer 4, and the thin-film layer 2.

To say nothing of the multilayer structure wherein one single thin-film layer 2 and one single color change layer 3 are stacked together, the authentication medium 1 may just as easily have the color change layer 3 formed of double layers. For instance, there may be a multilayer structure wherein, in order from below, two color change layers 3B and 3A and the thin-film layer 2 are stacked together as depicted in FIG. 1(d) or, alternatively, a multilayer structure wherein, in order from below, the thin-film layer 2 and two color change layers 3A and 3B are stacked together, as depicted in FIG. 1(e).

Further, the authentication medium 1 may have a multilayer structure wherein, in order from below, the color change layer, for instance, the light selective reflecting layer 3B, a phase difference layer 5 and the color change layer, for instance, 3A, as depicted in FIG. 2(a). The light selective reflecting layers 3B and 3A are preferably each formed of a cholesteric liquid crystal layer, and more preferably both adapted to reflect circularly polarized light in the same direction. In the embodiment of FIG. 2(a), the thin-film layer 2 is stacked on the side of the light selective reflecting layer A (3A) to form the authentication medium 1; of course, however, the thin-film layer 2 may just as easily stacked on the side of the light selective reflecting layer B (3B) to form the authentication medium 1.

The phase difference layer 5 here is a layer that is adapted to double refract incident light to produce a phase differing depending on the direction of polarization, thereby making a phase difference. Double refraction is a phenomenon that occurs because the refractive index of a medium differs depending on the direction of polarization, and it is known that the phase difference ρ of light transmitting through such a medium is given by $\rho = 2\pi(n_e - n_o)d/\lambda$ where $n_e$ is the refractive index of an extraordinary light ray, $n_o$ is the refractive index of an ordinary light ray, d is the thickness of the medium, and λ is the wavelength of light. In other words, for a medium having a certain thickness d, the phase difference ρ depends on the wavelength λ of light. As right-handed circularly polarized light with a wavelength $\lambda = 2(n_e - n_o)d$ enters the phase difference layer 5, it makes a phase difference $\rho = \pi$ (that is, ½ wavelength) while that right-handed circularly polarized light is transmitted through. Thus, the incident right-handed circularly polarized light is converted into left-handed circularly polarized light before leaving the phase difference layer 5, whereas incident left-handed circularly polarized light is converted into right-handed circularly polarized light before leaving the phase difference layer 5. Such a phase difference layer 5 may be formed, using not only a stretched plastic film as a transparent substrate film but also a nematic liquid crystal layer optionally with a transparent substrate film, as will be described later.

The color change layer 3 having a multilayer structure wherein the two color change layers B and A (3B and 3A) are stacked with the phase difference layer 5 interleaved between them is generally transparent at a time when the color change layers 3B and 3B are thin enough, so that an object on the opposite side can be seen through that multilayer structure.

Suppose here that the two color change layers comprised light selective reflecting layers B and A (3B and 3A), each adapted to reflect right-handed circularly polarized light. As natural light is now incident on the aforesaid basic elements from the side of the light selective reflecting layer A (3A) as depicted in FIG. 2(b), it allows only right-handed circularly polarized light to be selectively reflected under the action of the light selective reflecting layer A (3A) because the natural light includes right-handed and left-handed circularly polarized light, so that the reflected light (right-handed circularly polarized light) can be observed by way of a right-handed circularly polarizing sheet.

On the other hand, left-handed circular polarized light of the natural light incident from the light selective reflecting layer A (3A) transmits through the light selective reflecting layer A (3A). The transmitted left-handed circularly polarized light is converted into right-handed circularly polarized light through the phase difference layer 5 (in FIG. 2(b), "left→right" is indicative of the conversion of left-handed into right-handed circularly polarized light). The converted right-handed circularly polarized light is reflected off the light selective reflecting layer B (3B). This reflected light (right-handed circularly polarized light) is converted into left-handed circularly polarized light after again passing through the phase difference layer 5 (in FIG. 2(b), "right→left" is indicative of the conversion of right-handed into left-handed circularly polarized light). The converted left-handed circularly polarized light leaves the light selective reflecting layer A (3A), enabling the exit light (left-handed circularly polarized light) to be observed by way of a left-handed circularly polarizing sheet. At this time, if the two light selective reflecting layers A and B (3A and 3b) are designed in such a way as to have reflected light having different center wavelengths, it is then possible to implement double check making authentication surer, because there is the color of light differing between on observation with the right-handed circularly polarizing sheet and on observation with the left-handed circularly polarizing sheet.

The authentication medium 1 of the present invention is preferably used as an authenticable substrate in the form of a multilayer assembly with a suitable substrate material.

Figure 3A:
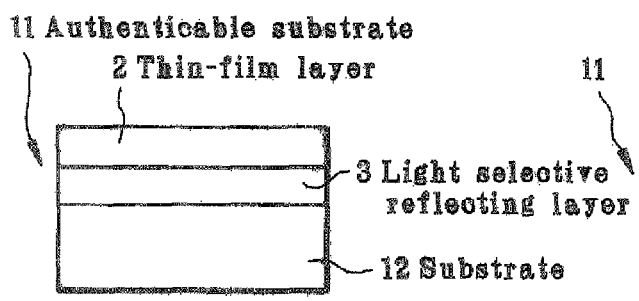
FIG. 3 is illustrative of one exemplary application of the authentication medium of the present invention.
Figure 3B:
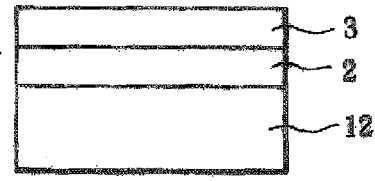
Figure 3C:
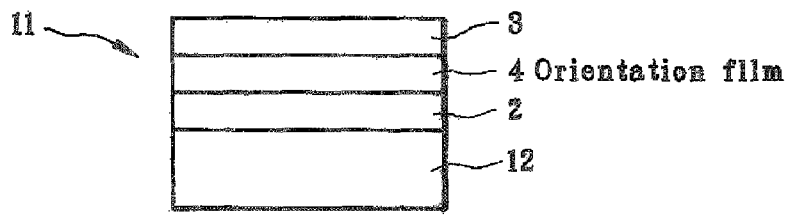

There are three possible multilayer assemblies, one wherein, as depicted in FIG. 3(a), a color change layer, for instance, a light selective reflecting layer 3 and a thin-film layer 2 are stacked on a suitable substrate 12 in order from the side of the substrate 12, another one wherein, as depicted in FIG. 3(b), a thin-film layer 2 and a color change layer, for instance, a light selective reflecting layer 3 are stacked on a suitable substrate 12 in order from the side of the substrate 12, and yet another one wherein, as depicted in FIG. 3(c), a thin-film layer 2, an orientation film 4 and a color change layer, for instance, a light selective reflecting layer 3 are stacked on a suitable substrate 12 in order from the side of the substrate 12, all providing authenticable assemblies 11. Each authenticable assembly 11 is a multilayer structure wherein the authentication medium 1 explained with reference to FIG. 1(a), 1(b), and 1(c) is stacked on the substrate 12.

Figure 4A:
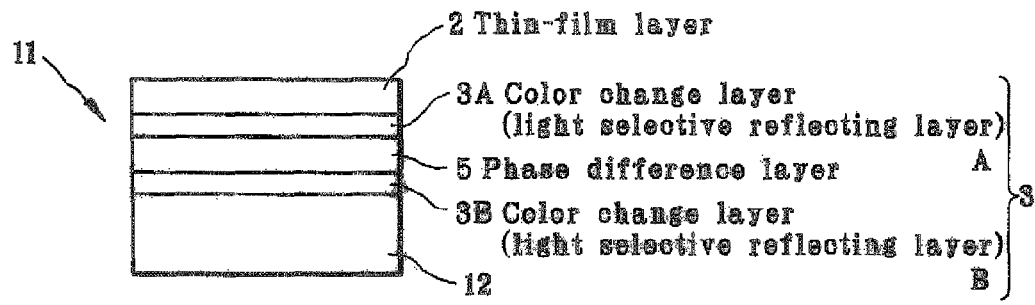
FIG. 4 is illustrative of another application of the authentication medium of the present invention.

An authenticable assembly 11 depicted in FIG. 4(a) has a multilayer structure wherein the authentication medium 1 explained with reference to FIG. 2(a) is stacked on a suitable substrate 12, that is, a color change layer, for instance, a light selective reflecting layer 3 and a thin-film layer 2 are stacked on the substrate 12 in order from the side of the substrate 12. The light selective reflecting layer 3 comprises a multilayer structure wherein, in order from the side of the substrate 12, a light selective reflecting layer B (3B), a phase difference layer 5 and a light selective reflecting layer A (3A) are stacked together. Although not shown, a multilayer assembly wherein, in order from the side of the substrate 12, the thin-film layer 2, the light selective reflecting layer A (3A), the phase difference layer 5 and the light selective reflecting layer B (3B) are stacked together, too, provides the authenticable multilayer assembly 11 of the present invention.

Figure 4B:
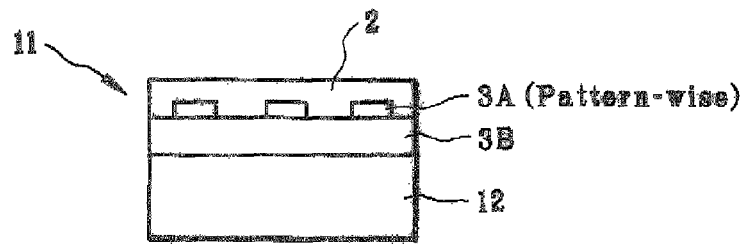

As depicted in FIG. 4(b), the authenticable multilayer assembly 11 may just as easily comprise a multilayer structure wherein a color change layer, for instance, a light selective reflecting layer B (3B), a pattern form of color change layer, for instance, a light selective reflecting layer A (3A) and a thin-film layer 2 are stacked on a substrate 12 in order from the side of the substrate 12; that is, the authentication medium 1 explained with reference to FIG. 1(d) is stacked on the substrate 12. Thus, when the color change layer 3 comprises two or more layers, at least one layer may be in a pattern form. It should be noted that although not shown, the authenticable assembly 11 may just as easily have a multilayer structure wherein the thin-film layer 2, the pattern form of color change layer, for instance, the light selective reflecting layer A (3A) and the light selective reflecting layer B (3B) are stacked together in order from the substrate 12. In any case, the order of stacking of the pattern form of light selective reflecting layer A (3A) and the light selective reflecting layer B (3B) may be reversed.

The thin-film layer 2 in the authentication medium 1 of the present invention should preferably change in light transmittance or reflectance upon heating. To this end, any desired material may be used provided that upon heating it undergoes melting, evaporation or a phase change to generate a pattern based on a light transmittance or reflectance difference between a portion heated and a portion unheated. However, it is preferable to use a relatively low melting metal such as Te, Sn, In, Al, Bi, Pb, or Zn, or their alloy or their compound such as Te-carbide. The thin-film layer 2 may be formed by way of a vacuum vapor deposition technique, a sputtering technique or a plating technique, although depending on the material used. The thin-film layer 2 has a thickness of about 10 μm to 1,000 μm.

The light selective reflecting layer 3 in the authentication medium 1 of the present invention is a layer formed of a light selective reflecting material able to selectively reflect either one of left-handed or right-handed circularly polarized light of incident light, for instance, a cholesteric crystal layer. The light selective reflecting layer 3 may be formed by the application and drying of a solution of cholesteric liquid crystals in a solvent by means of various printing techniques. Alternatively, it may be formed by preparing an ultraviolet polymerizable composition using polymerizable cholesteric liquid crystals, applying and drying the obtained ultraviolet polymerizable composition by means of various printing techniques, and thereafter irradiating that composition with ultraviolet radiation for polymerization.

When two or more light selective reflecting layers 3 are formed, it is preferable that the center wavelength of reflected light differs for each layer. Preferably to this end, those layers are formed with different thicknesses, or they are formed using materials having different helical pitches. When the light selective reflecting layer is formed of an ultraviolet polymerizable composition prepared using polymerizable chloresteric liquid crystals as mentioned above, polymerizable nematic liquid crystals are used in combination with a chiral agent. And then, if an ultraviolet polymerizable composition prepared using the polymerizable nematic liquid crystals and the chiral agent at varying blend ratios is used, it is then possible to form cholesteric liquid crystal layers having different helical pitches.

The polymerizable cholesteric liquid crystal materials used here are represented by compounds having the following general formula (1), and compounds having formulae (2) to (10). These compounds are monomers, but they may be in oligomer or polymer forms. The compounds having general formula (1) may be used in combination of two or more, and the compounds having general formula (1) and the compounds having formulae (1) to (10) may be used in combination of two or more as well.

Preferably in formula (1) given just below, $R^1$ and $R^2$ are each hydrogen or a methyl group, and X is chlorine or a methyl group. Small letters a and b indicative of the chain length of an alkylene group that is a spacer in the compounds having general formula (1) are preferably in the range of 2 to 9 so as to bring liquid crystals to an active level.

The aforesaid liquid crystal compound may contain a chiral agent as represented by formulae (11) to (13) given just below.

In formula (11), $R^3$ is indicative of hydrogen or a methyl group. In formulae (11) and (12), Y is any one of formulas (i) to (xxiv) given by formulae (14) and (15) given below. In formulae (11) to (13), small letters c, d and e indicative of the chain length of an alkylene group is preferably in the range of 2 to 9 so as to bring liquid crystals to an active level.

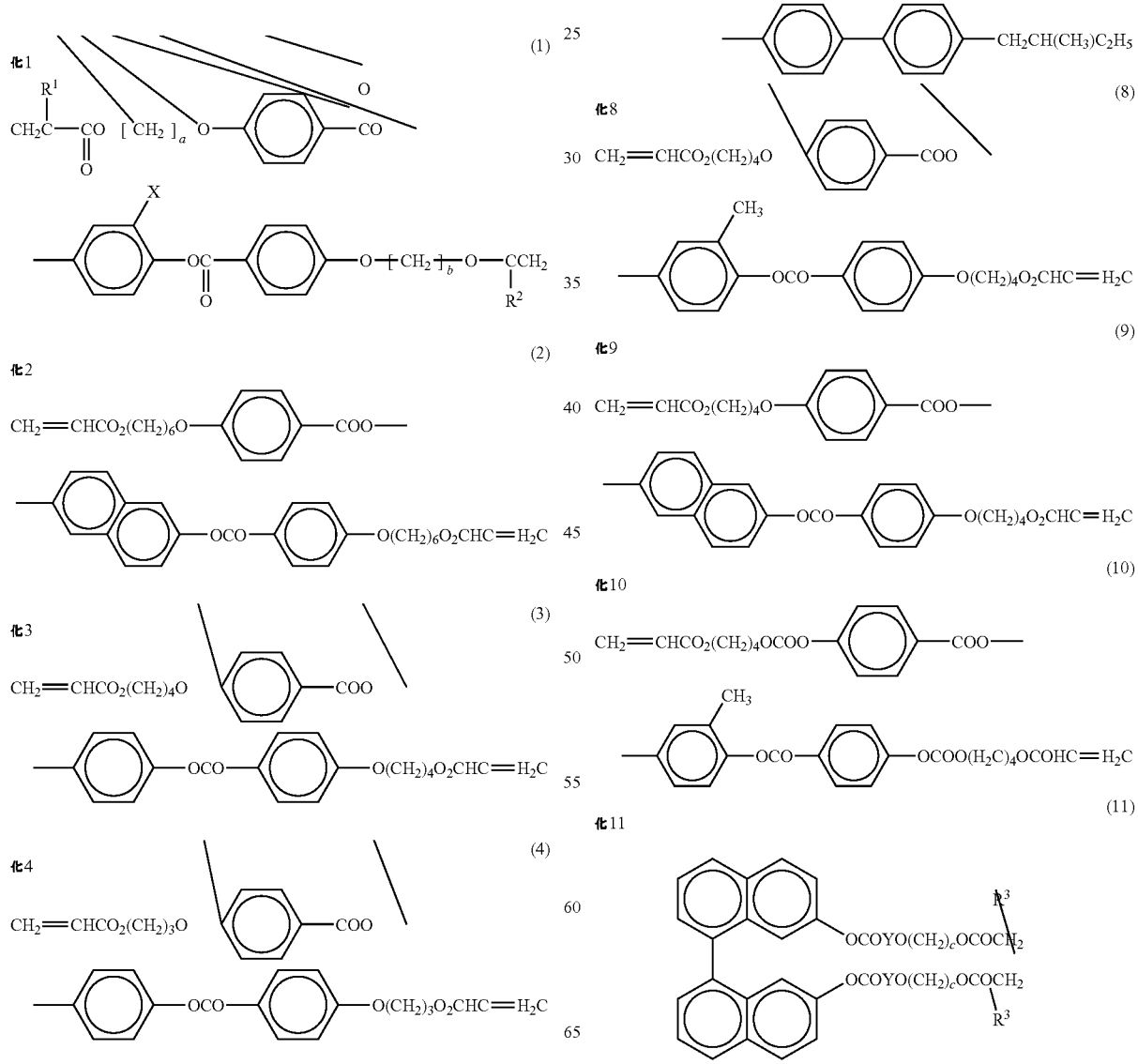

-continued
化12 (12)
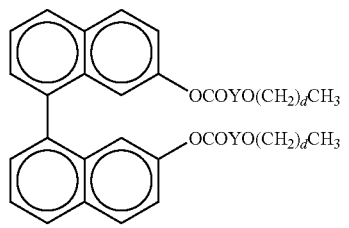
化13 (13)
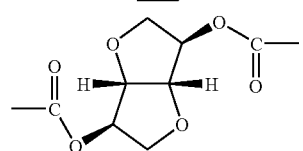
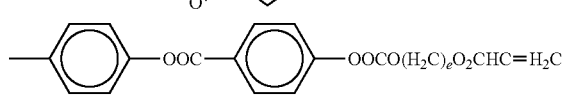
化14
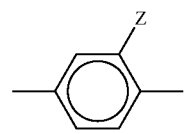 (i)
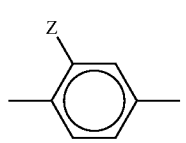 (ii)
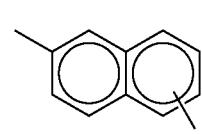 (iii)
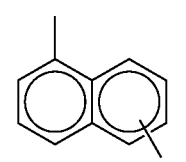 (iv)
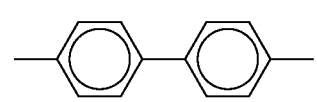 (v)
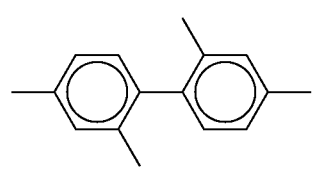 (vi)
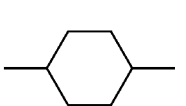 (vii)
-continued
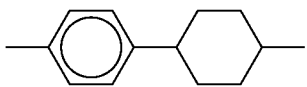 (viii)
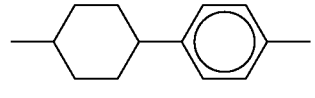 (ix)
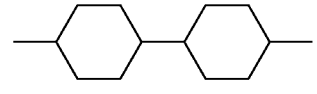 (x)
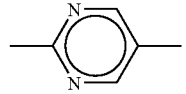 (xi)
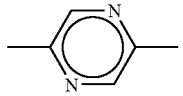 (xii)
 (xiii)
 (xiv)
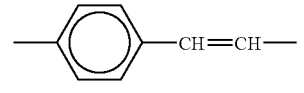 (xv)
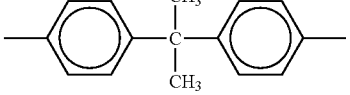 (xvii)
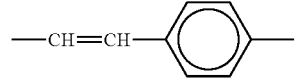 (xvi)
化15
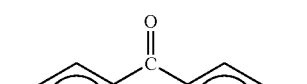 (xviii)
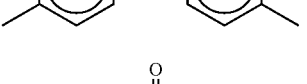 (xix)
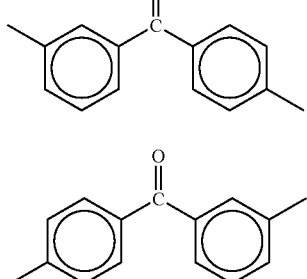 (xx)

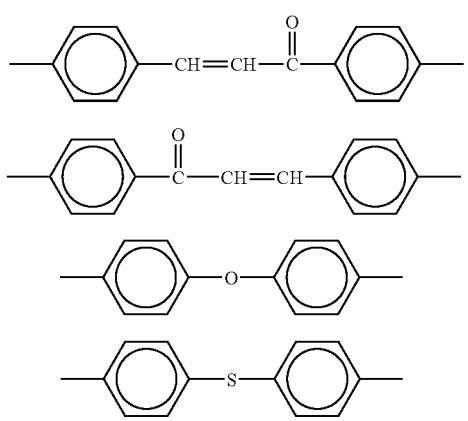

If necessary, an ultraviolet polymerization initiator together with a solvent and a diluent may be mixed with the cholesteric liquid crystal material and the chiral agent, for instance, at a cholesteric liquid crystal material:chiral agent: ultraviolet polymerization initiator blend ratio of 100:5:5 by mass. The obtained powders may then be dissolved in a solvent such as toluene to prepare a coating solution having a concentration of about 30% by mass. Note here that such blend ratios may be determined optionally depending on the cholesteric liquid crystal material and chiral agent used, the type of the ultraviolet polymerization initiator or the like, the coating mode and machine, and/or the desired coating amount.

The orientation film 4, on which the light selective reflecting layer 3 can be stacked, may be formed of any desired material such as polyvinyl alcohol resins (PVA) and polyimide resins provided that it can be used as a general orientation film. Usually, the orientation film 4 is formed by coating a solution of these resins in a solvent on a film or other suitable layer by means of a suitable coating technique, followed by drying, and rubbing with cloth, a brush or the like. It is here noted that when the film or the like is formed of a stretched plastic sheet, the orientation film 4 may be omitted, because the surface of that film has orientation capability as its own surface property.

The phase difference layer 5, for instance, may be formed using nematic liquid crystals. Specifically, it may be formed of an ink composition containing nematic liquid crystals, preferably, an ink composition comprising a solution of nematic liquid crystals in a solvent by means of various printing techniques. The phase difference layer 5 may be used just only alone, but also it may be stacked on the surface of a transparent film having orientation capability in itself optionally through the orientation film. It is here noted that a stretched plastic film itself, too, can become the phase difference layer 5, and that a multilayer assembly wherein a phase difference layer is stacked on such a plastic film, a multilayer assembly wherein a phase difference layer is stacked on a plastic film through an orientation film 6 or the like may also generally function as the phase difference layer 5.

A substrate 12, on which the authentication medium 1 of the present invention is to be stacked, may be formed of paper, plastics, metal foils or their composite materials. More practically, the substrate 12 may have been processed in the form of so-called cards such as credit cards and bank cards, various tradable coupons, commuting passes or ID cards which, if counterfeited or doctored, may incur various hassles. The aforesaid material has often been printed, laminated, embossed or otherwise processed, or provided thereon with a magnetic recording layer or embedded therein with an IC chip. In most cases, the substrate 12 has been printed, or provided thereon with a magnetic recording layer.

When the necessary characters, patterns, etc. are recorded in the authentication medium 1 of the present invention, they are recorded in the thin-film layer 2 that changes in light transmittance or reflectance upon heating, using means such as a thermal head or laser light, which makes a dot pattern of heating possible depending on input information. FIG. 5(a) is illustrative of an authentication medium 1 stacked all over the surface of a substrate, wherein there is a recording area 13 provided on an authenticable assembly 11. In the embodiment shown, capitals "DD" are formed on the recording area 13. The authenticable assembly 11 has been described with reference to FIG. 3 or FIG. 4, Here, what has a multilayer structure as described with reference to FIG. 3(a) is going to be used as the authenticable assembly; of course, however, authenticable assemblies having other multilayer structures may just as easily be used. With the authenticable assembly having the multilayer structure as described with reference to FIG. 3(a), imagine now that the thin-film layer 2 is volatilized off in a narrow strip form that forms the capitals "DD". The light selective reflecting layer 3 below the portion removed off can be seen, and when the light selective reflecting layer 3 comprises cholesteric liquid crystals, there is a hue varying dependent oh the angle of viewing. In other words, the capitals "DD" would appear to have different hues depending on the angle of viewing.

For recording, the authentication medium 1 of the present invention may be used with non-heat sensitive recording techniques using an ink jet printer, a thermal transfer printer, etc. Recordings applied by such non-heat-sensitive recording techniques get to have counterfeit-proof capability against the backdrop of the thin-film layer that changes in light transmittance or reflectance upon heating and/or the color change layer that change in color depending on the angle of viewing. If the aforesaid non-heat sensitive recording techniques are used in combination with the thermal recording techniques using a thermal head, laser light or the like, much higher counterfeit-proof capability can then be added to the authentication medium 1.

Figures 5B, 5C:
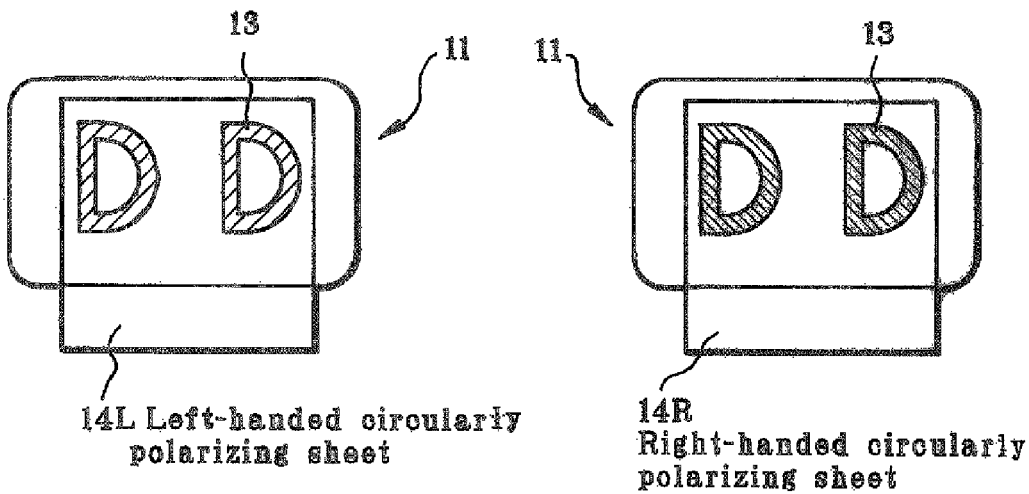

Consider here that a left-handed circularly polarizing sheet 14L is put over the authenticable assembly 11 in the state of FIG. 5(a), as depicted in FIG. 5(b). If the light selective reflecting layer 3 is adaptive to selectively reflect the left-handed circularly polarized light of incident light, the reflected light will be observed, or seen colored on the basis of the thickness or helical pitch of the light selective reflecting layer 3. When a right-handed circularly polarizing sheet 14R is put over as depicted in FIG. 5(c), on the contrary, there will be no reflected light observed.

Consider then the case where the authenticable assembly 11 depicted in FIG. 5(a) is the one described with reference to FIG. 4(a) and the light selective reflecting layers A (3A) and B (3B) are adaptive to selectively reflect right-handed circularly polarized light. As the left-handed circularly polarizing sheet 14L is put over as depicted in FIG. 5(b), the light reflected off the light selective reflecting layer B (3B) located below will be seen, and as the right-handed circularly polarizing sheet 14R is put over as depicted in FIG. 5(c), the light reflected off the light selective reflecting layer A (3A) located above will be seen. In either case, the reflected light will be seen colored on the basis of the thickness or helical pitch of the light selective reflecting layer A (3A) or B (3B). As already noted, there is then a difference in the color of light between on observation with the left-handed circularly polarizing sheet 14L and on observation with right-handed circularly polarizing sheet 14R, which makes double check achievable and authentication surer as well.

While reference has been made to the case where the authentication medium 1 of the present invention is stacked on the surface of the substrate 12, especially on its viewing side, it should be understood that if the substrate 12 is transparent, the authentication medium 1 may then be stacked on its non-viewing side. Further, if the authentication medium 1 of the present invention is cut into a very narrow, elongate thread form of about 0.5 mm to about 5 mm, then it may be put on a recess in the substrate 12 or visibly embedded in a substrate such as paper. If a thread form of authentication medium 1 is applied onto the substrate, e.g., a tradable coupon paper, then it remains unnoticeable or looks just as a simple decoration, but it makes sure the authentication of that paper, as mentioned above.

If the authentication medium 1 of the present invention described with reference to FIGS. 1 and 2 is Configured or otherwise processed into label, transfer sheet or other forms, as explained with reference to FIG. 6 or 7, then it can be more easily applied to various articles or objects.

FIG. 6 is illustrative of a label form of authentication medium. In the embodiment shown, on the upper surface side of a substrate film 22, a color change layer, for instance, a light selective reflecting layer B (3B), a phase difference layer 5, a color change layer, for instance, a light selective reflecting layer A (3A), a thin-film layer 2 and a protective layer 24 are stacked in order from the side of the substrate film 22, and on the lower surface side of the substrate film 22, an adhesive layer 23 is stacked, thereby forming an authentication medium label 21. If necessary, a releasable sheet is provided on an exposed surface of the adhesive layer 23. In the embodiment depicted in FIG. 6, the authentication medium 1 described with reference to FIG. 2(a) is stacked on the substrate 22, the protective layer 24 is provided as the uppermost layer, and the adhesive layer 23 is stacked on the lower surface side of the substrate 22. However, it is noted that the authentication medium 1 may contain more than does the one described with reference to FIG. 2(a). It is also possible to make do without the protective layer 24. Further, it is noted that the authentication medium 1 plus the adhesive layer 23 may just as easily be stacked on the lower surface side of the substrate film 22, or when the authentication medium 1 plus the adhesive layer 23 are stacked on the lower surface side of the substrate film 22 as mentioned above, the protective layer 24 may be stacked on the upper surface side of the substrate film 22.

FIG. 7 is illustrative of a transfer sheet form. In the embodiment of an authentication medium transfer sheet 31 shown, on the lower surface side of a substrate film 22, a protective layer 24, a thin-film layer 2, a color change layer, for instance, a light selective reflecting layer 3 and an adhesive layer 23 are stacked in this order, with the substrate film 22 releasable from the protective layer 24. The light selective reflecting layer 3 has a multilayer structure wherein a light selective reflecting layer A (3A), a phase difference layer 5 and a light selective reflecting layer B (3B) are stacked in order from the thin-film layer 2 side. In this authentication medium transfer sheet 31, the authentication medium 1 described with reference to FIG. 2(a) is stacked. However, it is noted that the authentication medium 1 may contain more than does the one described with reference to FIG. 2(a). It is also possible to make do without the protective layer 24. Further, it is noted that when an adhesive is applied onto the surface of an application member, it is also possible to make do without the adhesive layer 23 provided as the lowermost layer.

In the authentication medium label 21 or the authentication medium transfer sheet 31 configured as described above, the authenticable assembly 11 may just as easily be used in place of various multilayer structures of the authentication medium 1. In this case, the authentication medium label 21, and the authentication medium transfer sheet 31 comes to have both the substrate film 22 and the substrate 12, because the authenticable assembly 11 involves the substrate 12 in itself.

The authentication medium 1 or the authenticable assembly 11 of the present invention may be fabricated by the successive stacking of the respective layers on a suitable permanent or temporary substrate or, alternatively, it may be fabricated by use of the authentication medium label 21 or the authentication medium transfer sheet 31 configured as described above. After peeling off the releasable sheet if any, the authentication medium label 21 may be applied at the adhesive layer 23 to an article that is an application member, and the authentication medium transfer sheet 31 may be bonded at the adhesive layer 23 to an article that is an application member, followed by a release of the substrate film 22.

The substrate film 22 for the formation of the authentication medium label 21, and the authentication medium transfer sheet 31 should preferably have mechanical strength as well as solvent and heat resistance well capable of standing up to a processing operation for the fabrication of the label 21, and the transfer sheet 31. Depending on purpose but not by way of limitation, preference is given to a film or sheet form of plastic material. Specific mention is made of various plastic films such as those based on polyethylene terephthalate (PET), polycarbonate, polyvinyl alcohol, polysulfone, polyethylene, polypropylene, polystyrene, polyarylate, triacetyl cellulose (TAC), diacetyl cellulose, and polyethylene/vinyl alcohol.

For the adhesive layer 23 that forms a part of the authentication medium label 21, and the authentication medium transfer sheet 31, either heat-sensitive adhesives or pressure-sensitive adhesives may be used.

Further, for the protective layer 24 that forms a part of the authentication medium label 21, and the authentication medium transfer sheet 31, not only are thermoplastic resins or thermal setting resins used as a binder resin in general ink or coating materials used, but also ionizing radiation curable resins such as ultraviolet or electron beam curable resins are usable.

Example 1

A polymerizable cholesteric liquid crystal solution was gravure printed on the surface of a 50 µm thick PET film, then dried, and finally irradiated with ultraviolet radiation to form a 2.2 µm thick cholesteric liquid crystal layer all over the surface. The polymerizable cholesteric liquid crystal solution used here was a 20% solution containing a polymerizable nematic liquid crystal ("Palio Color LC242" made by BASF), a chiral agent ("Palio Color LC756" made by BASF) and an ultraviolet polymerization initiator with toluene as a solvent. The polymerizable nematic liquid crystal/chiral agent blend ratio was 95.5/4.5, and the content of the ultraviolet polymerization initiator was 5% relative to the polymerizable nematic liquid crystal.

A polyester resin base anchor coating layer was gravure printed on the thus formed cholesteric liquid crystal layer, a 250 nm thick Sn thin-film layer was formed on the anchor coating layer by means of vapor deposition, and a urethane resin base protective layer was gravure printed on the Sn thin-film layer to obtain a thermal recording film.

Using a thermal head, printing was carried out from the protective layer side of the thermal recording film. As the thermal recording film after printing was viewed, the hue of the cholesteric liquid crystal at the printed site changed depending on the angle of viewing. As the printed site was viewed through a right-handed circularly polarizing sheet put over it, it was seen in green, and upon changing to a left-handed circularly polarizing sheet, that color was out of sight.

Example 2

A release paper with an adhesive coated on it was put over the surface, with nothing applied on it, of the PET film of the thermal recording film obtained in Example 1 to obtain a multilayer structure in which the protective layer, Sn thin-film layer, anchor coating layer, cholesteric liquid crystal layer, PET film, adhesive layer and release paper were stacked together in this order. Then, that multilayer structure was punched out in a given shape to obtain a label form of thermal recording film.

Example 3

A multilayer structure with a heat-sensitive adhesive layer applied on each surface of the thermal recording film obtained in Example 1 was processed into a 2 mm wide thread form interleaved between paper layers to obtain a thread paper sheet.

Example 4

Instructions or directions were printed on the surface, with nothing applied on it, of the PET film of the thermal recording film obtained in Example 1 to make a prepaid card.

Example 5

A 250 nm thick Sn thin-film layer was formed by vapor deposition on the surface of a 12 μm thick PET film. A PVA solution (a 5% aqueous solution transparent) of PVA Resin made by Kuraray Co., Ltd.: Product No. 110) was coated and dried on the Sn thin-film layer, and then rubbed to form an orientation film. The same polymerizable cholesteric liquid crystal layer as used in Example 1 was gravure printed on that orientation film, then dried, and finally irradiated with ultraviolet radiation to obtain a thermal recording film with a 2.2 μm thick cholesteric liquid crystal layer formed all over the surface.

Using a thermal head, printing was carried out from the PET film side of the thermal recording film. As the thermal recording film after printing was viewed, the hue of the cholesteric liquid crystal layer at the printed site changed depending on the angle of viewing. As the printed site was viewed through a right-handed circularly polarizing sheet put over it, it was seen in green, and upon changing to a left-handed circularly polarizing sheet, that color was out of sight.

Following the above procedure with the exception that a thicker PET film of 50 μm was used, a thermal recording film was obtained, and printing was carried out from the liquid crystal layer side. In this case, too, similar effects were obtained.

Example 6

The same polymerizable cholesteric liquid crystal solution as used in Example 1 was gravure printed on one surface of a 50 μm thick PET film, then dried, and finally irradiated with ultraviolet radiation to form a 2.2 μm thick cholesteric liquid crystal layer (A) all over that surface. Subsequently, a polymerizable cholesteric liquid crystal solution different from that for the cholesteric liquid crystal layer (A) was formed on the surface of the PET film that faced away from the cholesteric liquid crystal layer (A) to form a cholesteric liquid crystal layer (B). Thereafter, a 250 nm thick Sn thin-film layer was formed by vapor deposition on the cholesteric liquid crystal layer (B) to obtain a thermal recording film. Note here that the polymerizable cholesteric liquid crystal layer used to form the cholesteric liquid crystal layer (B) was similar to that used for the cholesteric liquid crystal layer (A) with the exception that the polymerizable nematic liquid crystal/chiral agent blend ratio was 95.5/4.5.

Using a thermal head, printing was carried out on the thermal recording film. As the thermal recording film after printing was viewed, the hue of each cholesteric liquid crystal layer at the printed site changed depending on the angle of viewing. As the printed site was viewed through a right-handed circularly polarizing sheet put over it, it was seen in green, and upon changing to a left-handed circularly polarizing sheet, that color turned into red.

Figure 8A:
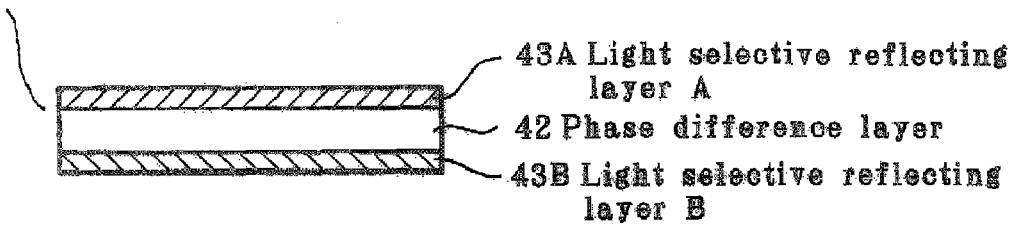
FIG. 8 is illustrative of the most basic multilayer structure of another authentication medium of the present invention.
Figure 8B:
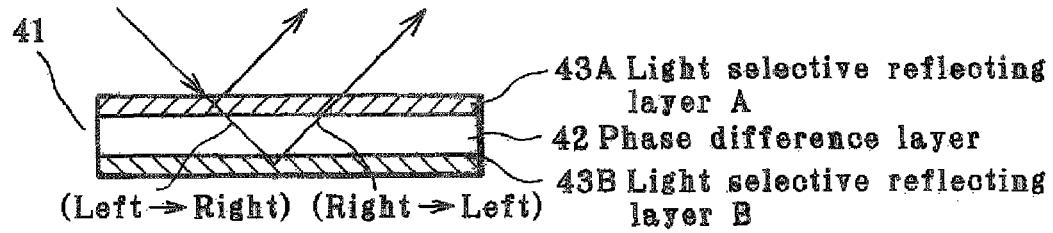
Figure 9A:
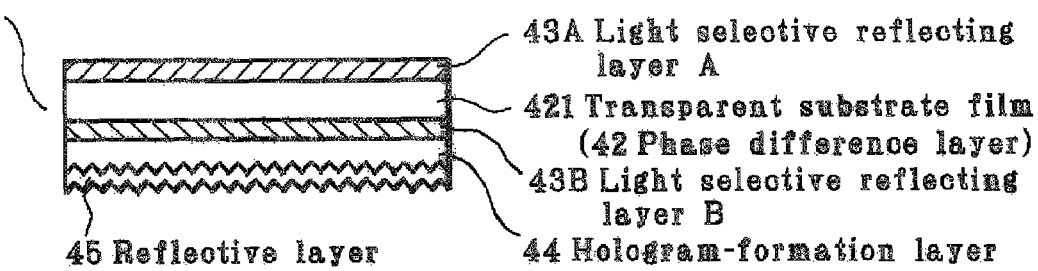
FIG. 9 is illustrative of the multilayer structure of one embodiment of another authentication medium of the present invention.
Figure 9B:
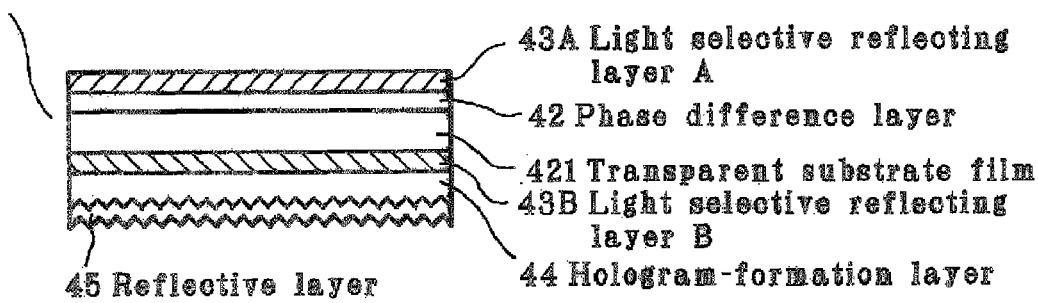

FIG. 8 is illustrative of the basic multilayer structure of another authentication medium according to the present invention. FIGS. 9 and 10 are illustrative of a preferable embodiment of another authentication medium according to the present invention. FIG. 11 is illustrative of a form suitable for the application to an article of another authentication medium according to the present invention. FIG. 12 is illustrative of an example of application of another authentication medium of the present invention.

Most basically, another authentication medium 41 of the present invention has a multilayer structure comprising two light selective reflecting layers A and B (43A and 43B) between which there is a phase difference layer 42 interleaved, as depicted in FIG. 8(*a*). Two light selective reflecting layers A and B (43A and 43B) are each preferably formed of a material having light selective reflecting capability enough to selectively reflect either one of left-handed or right-handed circularly polarized light of incident light, and most preferably both are adaptive to reflect the circularly polarized light in the same direction. For instance, those layers A and B may be each formed of a cholesteric liquid crystal layer. It is also preferable that two such light selective reflecting layers A and B (43A and 43B) have a different center wavelength of reflected light.

The phase difference layer 42 interleaved between the two light selective reflecting layers A and B is a layer that is adapted to double refract incident light to produce a phase differing depending on the direction of polarization, thereby making a phase difference. Double refraction is a phenomenon that occurs because the refractive index of a medium differs depending on the direction of polarization, and it is known that the phase difference ρ of light transmitting through such a medium is given by $\rho = 2\pi(ne-no)d/\lambda$ where ne is the refractive index of an extraordinary light ray, no is the refractive index of an ordinary light ray, d is the thickness of the medium, and λ is the wavelength of light. In other words, for a medium having a certain thickness d, the phase difference ρ depends on the wavelength λ of light. As right-handed circularly polarized light with a wavelength $\lambda = 2(ne-no)d$ enters the phase difference layer 42, it makes a phase difference ρ=π (that is, ½ wavelength while that right-handed circularly polarized light is transmitted through. Thus, the incident right-handed circularly polarized light is converted into left-handed circularly polarized light before leaving the phase difference layer 5, whereas incident left-handed circularly polarized light is converted into right-handed circularly polarized light before leaving the phase difference layer 5. Such a phase difference layer 42 may be formed, using not only a stretched plastic film as a transparent substrate film but also a nematic liquid crystal layer optionally with a transparent substrate film, as will be describe later.

The aforesaid basic arrangement, i.e., the multilayer assembly having a multilayer structure wherein the two light selective reflecting layers A and B (43A and 43B) are stacked with the phase difference layer 42 interleaved between them is generally transparent at a time when the respective light selective reflecting layers A and B are thin enough, so that an object on the opposite side can be seen through that multilayer assembly. Of the multilayer structure of that basic arrangement, there are some variations, as will be described later.

Suppose here that the two light selective reflecting layers A and B (43A and 43B) were each adapted to selectively reflect right-handed circularly polarized light. As natural light is now incident on the aforesaid basic elements from the side of the light selective reflecting layer A (43A) as depicted in FIG. 8(*b*), it allows only right-handed circularly polarized light to be selectively reflected under the action of the light selective reflecting layer A (43A) because the natural light includes right-handed and left-handed circularly polarized light, so that the reflected light (right-handed circularly polarized light) can be observed by way of a right-handed circularly polarizing sheet.

On the other hand, left-handed circular polarized light of the natural light incident from the light selective reflecting layer A (43A) side transmits through the light selective reflecting layer A (43A). The transmitted left-handed circularly polarized light is converted into right-handed circularly polarized light through the phase difference layer 42 (in FIG. 8(*b*), "left→right" is indicative of the conversion of left-handed into right-handed circularly polarized light). The converted right-handed circularly polarized light is reflected off the light selective reflecting layer B (43B). This reflected light (right-handed circularly polarized light) is converted into left-handed circularly polarized light after again passing through the phase difference layer 42 (in FIG. 8(*b*), "right→left" is indicative of the conversion of right-handed into left-handed circularly polarized light). The converted left-handed circularly polarized light leaves the light selective reflecting layer A (43A), enabling the exit light (left-handed circularly polarized light) to be observed by way of a left-handed circularly polarizing sheet.

Therefore, if the authentication medium 41 of the present invention basically constructed as described with reference to FIG. 8 is affixed or otherwise applied to an article for which authentication is required, then the lower layer can be seen through. In addition, the sole use of the right-handed or left-handed circularly polarizing sheet allows the light taking such different paths as mentioned above to be observed. Further, with the two light selective reflecting layers A and B (43A and 43*b*) designed in such a way as to have reflected light having different center wavelengths, it is then possible to implement double check making authentication surer, because there is a difference in the color of light between on observation with the right-handed circularly polarizing sheet and on observation with the left-handed circularly polarizing sheet.

The authentication medium 41 of the present invention may be applied to various articles alone or in combination with other authenticable means.

FIG. 9 is illustrative of an example of application of the basic elements explained with reference to FIG. 8 to a hologram. In an authentication medium 41 of the present invention, a light selective reflecting layer A (43A) is stacked on one surface of a transparent substrate film 421, and a light selective reflecting layer B (43B), a hologram-formation layer 4 and a reflective layer 5 are stacked in this order on the side of the transparent substrate film 421 that faces away from the light selective reflecting layer A (43A), as depicted in FIG. 9(*a*).

As depicted in FIG. 9(*b*), the authentication medium 41 of the present invention may just as easily have a multilayer structure wherein a phase difference layer 42 and a light selective reflecting layer A (43A) are stacked in this order on one surface of a transparent substrate film 421, and a light selective reflecting layer B (43B), a hologram-formation layer 44 and a reflective layer 45 are stacked in this order on the side of the transparent substrate film 421 that faces away from the phase difference layer 42 and light selective reflecting layer A (43A). Note here that in the multilayer structure explained with reference to FIG. 9(*a*), the transparent substrate film 421 has both a support function and a function as the phase difference layer 42. The multilayer here wherein there are the light selective reflecting layer A (43A), phase difference layer 42, transparent substrate film 421 and light selective reflecting layer B (43B) stacked in this order, too, is one variation of the basic multilayer structure of the authentication medium 41 of the present invention.

Alternatively, as depicted in FIG. 10, the authentication medium 41 of the present invention may just as easily have a multilayer structure wherein a transparent substrate 421 and a phase difference layer 42 are stacked with an orientation film A (46A) interleaved between them, and the transparent substrate film 421 and a light selective reflecting layer B (43B) are stacked with an orientation film B (46B) interleaved between them. The multilayer structure here wherein there are a light selective reflecting layer A (43A), the phase difference layer 42, the orientation layer A (46A), the transparent substrate film 421, the orientation film B (46B) and a light selective reflecting layer B (43B) stacked in this order, too, is one variation of the basic multilayer structure of the authentication medium 41 of the present invention.

In the authentication medium 41 that is a preferable embodiment of the present invention described with reference to FIGS. 9 and 10, the hologram-formation layer and reflective layer on the back surface side ensure the visibility of the hologram, because the already explained basic elements can be seen through. Further, when both light selective reflecting layers A and B (43A and 43B) are able to selectively reflect either one of left-handed or right-handed circularly polarized light of incident light and there is a difference in the center wavelength of reflected light, there is a different color observed upon viewing with a right-handed circularly polarizing sheet, and a left-handed circularly polarizing sheet. Therefore, when the authentication medium 41 is used for authentication purposes, not only does the appearance and characteristics of the hologram make sure difficulty of fabrication, but also authentication can be implemented with double check means relying on a right-handed and a left-handed circularly polarizing sheet, so that an article to which such an authentication medium is applied has an advantage of authentication being implemented with an ever higher reliability.

The two light selective reflecting layers A and B (43A and 43B) in the authentication medium 41 of the present invention are each a layer formed of a light selective reflecting material able to selectively reflect either one of left-handed and right-handed circularly polarized light of incident light, for instance, a cholesteric crystal layer.

The two light selective reflecting layers A and B (43A and 43B) may be formed by the application and drying of a solution of cholesteric liquid crystals in a solvent by means of various printing techniques. Alternatively, they may be formed by preparing an ultraviolet polymerizable composition using polymerizable cholesteric liquid crystals, applying and drying the obtained ultraviolet polymerizable composition by means of various printing techniques, and thereafter irradiating that composition with ultraviolet radiation for polymerization.

For the two light selective reflecting layers And B (43A and 43B), it is preferable that the center wavelength of reflected light differs for each layer. Preferably to this end, those layers are formed with different thicknesses, or they are formed using materials having different helical pitches. When the light selective reflecting layer is formed of an ultraviolet polymerizable composition prepared using polymerizable chloresteric liquid crystals as mentioned above, polymerizable nematic liquid crystals are used in combination with a chiral agent. And then, if an ultraviolet polymerizable composition prepared using the polymerizable nematic liquid crystals and the chiral agent at varying blend ratios is used, it is then possible to form cholesteric liquid crystal layers having different helical pitches.

For the transparent substrate film 421, it is preferable to use a material that can be made thin, and has mechanical strength as well as solvent and heat resistance well capable of standing up to a processing operation for the fabrication of the authentication medium. Depending on purpose but not by way of limitation, preference is given to a film or sheet form of plastic material. Specific mention is made of various plastic films such as those based on polyethylene terephthalate (PET), polycarbonate, polyvinyl alcohol, polysulfone, polyethylene, polypropylene, polystyrene, polyarylate, triacetyl cellulose (TAC), diacetyl cellulose, and polyethylene/vinyl alcohol.

If necessary, an orientation film is stacked on one or each of the transparent substrate film 421. The orientation film may be formed of any desired material such as polyvinyl alcohol resins (PVA) and polyimide resins provided that it can be used as a general orientation film. Usually, the orientation film is formed by coating a solution of these resins in a solvent on the transparent substrate film 421 by means of a suitable coating technique, followed by drying and rubbing with cloth, a brush or the like. It is here noted that when the transparent substrate film 421 is formed of a stretched plastic sheet, the orientation film may be dispensed with, because the surface of that film has orientation capability as its own surface property.

The phase difference layer 42, for instance, may be formed using nematic liquid crystals. Specifically, it may be formed of an ink composition containing nematic liquid crystals, preferably, an ink composition comprising a solution of nematic liquid crystals in a solvent by means of various printing techniques. The phase difference layer 42 may be used just only alone, but also it may be stacked on the surface of the transparent substrate film 421 having orientation capability in itself optionally through the orientation film 46. It is here noted that if the transparent substrate film 421 is a stretched plastic film itself, it can become the phase difference layer 42 too, and that a multilayer assembly wherein the phase difference layer 42 is stacked on the transparent substrate film 421, a multilayer assembly wherein the phase difference layer 42 is stacked on the transparent substrate film 421 through the orientation film 46 or the like may also generally function as the phase difference layer 42.

The hologram-formation layer 44 has a fine relief pattern of relief hologram formed on one surface of a layer comprised of a transparent resin material.

For the transparent resin material for the formation of the hologram-formation layer 44, a variety of thermoplastic resins, thermosetting resins or ionizing radiation curable resins may be used. The thermoplastic resins include acrylic ester resins, acrylamide resins, nitrocellulose resins, polystyrene resins or the like; and the thermosetting resins include unsaturated polyester resins, acrylic urethane resins, epoxy-modified acrylic resins, epoxy-modified unsaturated polyester resins, alkyd resins, phenol resins or the like. Those thermoplastic resins and thermosetting resins may be used alone or in combination of two or mores. One or two or more of such resins may be crosslinked by way of various isocyanate resins, or may be blended with various curing catalysts such as metal soaps, for instance, cobalt or zinc naphthenate, or thermal or ultraviolet polymerization initiators such as peroxides represented by benzoyl peroxide and methyl ethyl ketone peroxide, benzophenone, acetophenone, anthraquinone, naphthoquinone, azobis-isobutyronitrile or diphenyl sulfide. The ionizing radiation curable resins include epoxy acrylate, urethane acrylate, acrylic-modified polyester or the like. It is acceptable to introduce a crosslinked structure in those ionizing radiation curable resins or blend with them mono- or poly-functional monomers, oligomers, etc. for the purpose of viscosity adjustment.

The hologram-formation layer 44 may be formed directly from that resin material by subjecting a photo-sensitive resin material to holographic interference exposure, followed by development; however, it is preferable that a copying mold such as a previously formed relief hologram or its replica, or their plating mold is pressed at its surface against the aforesaid resin material for copying. When the thermosetting resin or the ionizing radiation curable resin is used, an uncured resin is cured by heating or irradiation with ionizing radiation while it is in tight contact with the surface of the mold. After curing, the resin is released off to form a fine relief pattern of relief hologram on one surface of the cured transparent resin material layer. The hologram-formation layer 44 here is understood to include a diffraction grating-formation layer having a pattern form of diffraction grating prepared in similar ways. The hologram-formation layer and the diffraction grating-formation layer will hereinafter be collectively called the light diffraction structure layer.

The reflective layer 45 formed along the fine relief pattern of the relief hologram may be either a reflective metal thin film or a transparent layer having a refractive index different from that of the hologram-formation layer 44. The use of the former gives an opaque hologram, whereas the use of the latter gives a transparent hologram. In either case, there is a reflection hologram obtained, which is improved in visibility as viewed under illumination from the viewer side.

The material for the formation of the reflective metal thin film includes metals such as Al, Cr, Ti, Fe, Co, Ni, Cu, Ag, Au, Ge, Mg, Sb, Pb, Cd, Bi, Sn, Se, In, Ga, and Rb, or their oxides or nitrides. The reflective metal thin film may also be formed of one or two or more of such materials. Among others, particular preference is given to Al, Cr, Ni, Ag, and Au, with a film thickness of preferably 1 nm to 10,000 nm, and more preferably 2 nm to 200 nm.

For the material for constituting the transparent layer having a refractive index different from that of the hologram-formation layer 44, there is a transparent material having a refractive index different from that of the resin material for the hologram-formation layer. The refractive index of that transparent material may be either larger or smaller than that of the resin of the hologram-formation layer; however, it is desired that there be a refractive index difference of preferably at least 0.1, more preferably at least 0.5, and even more preferably at least 1.0. Specifically, titanium oxide ($TiO_2$), zinc sulfide (ZnS), a Cu.Al composite metal oxide and so on are preferred. Note here that a metal thin film of less than 20 nm in thickness, too, may be used as the material for constituting the transparent layer having a refractive index different from that of the hologram-formation layer 44, because of having transparency.

No matter what the reflective layer 45 is formed of, it may be provided by means of known techniques such as sublimation, vacuum vapor deposition, sputtering, reactive sputtering, ion plating, and electroplating.

The authentication medium 41 described with reference to FIGS. 8-10 is configured or otherwise processed into a label or transfer sheet form as explained with reference to FIG. 11, whereby it may just as easily be applied to various articles.

FIG. 11(a) shows a label form. In the embodiment shown, the authentication medium 41 (FIG. 9(b)) comprises a multilayer structure wherein a phase difference layer 42 and a light selective reflecting layer A (43A) are stacked in this order on one surface of a transparent substrate film 421, and a light selective reflecting layer B (43B), a hologram-formation layer 44 and a reflective layer 45 are stacked on the side of the transparent substrate film 421 that faces away from the phase difference layer 42 and light selective reflecting layer A (43A). Then, an adhesive layer 52 is stacked on the reflective layer 45 side of the authentication medium 41, thereby forming an authentication medium label 51. For the authentication medium 41 that forms a part of the authentication medium label 42, not only the aforesaid multilayer structure but also other multilayer structures described with reference to FIGS. 8-10 may be used.

FIG. 11(b) shows a transfer sheet form. In the embodiment shown, the authentication medium 41 (FIG. 9(b)) comprises a multilayer structure wherein a phase difference layer 42 and a light selective reflecting layer A (43A) are stacked on one surface of a transparent substrate film 421 and a light selective reflecting layer B (43B), a hologram-formation layer 44 and a reflective layer 45 are stacked on the side of the transparent substrate film 421 that faces away from the phase difference layer 42 and light selective reflecting layer A (43A). Then, an adhesive layer 52 is stacked on the reflective layer 45 side of that medium 41 and the releasing surface 54a side of a releasable substrate 54 is stacked on the light selective reflecting A (43A) side of that medium 41, thereby forming an authentication medium transfer sheet 53. For the authentication medium 41 that forms a part of the authentication medium transfer sheet 53, not only the aforesaid multilayer structure but also other multilayer structures described with reference to FIGS. 8-10 may be used.

For the purpose of enhancing the effect of reflected light being seen in different colors between on observation with a right-handed circularly polarizing sheet and on observation with a left-handed circularly polarizing sheet and/or for the purpose of enhancing the visibility of the hologram when the hologram-formation layer 44 or the reflective layer 45 is stacked on a lower layer side, it is preferable that a dark color layer such as a resin layer colored in black or like color is provided below each layer. When the adhesive layer 52 is provided as a lower layer as explained with reference to FIG. 11, a dark color layer may be interleaved between the reflective layer 45 and the adhesive layer 52 or, alternatively, a dark color adhesive layer colored in black or like color may be used to provide the adhesive layer 52 instead of using another dark color layer.

The authentication medium 41 of the present invention, preferably in the form of the authentication medium label 51 or the authentication medium transfer sheet 53 as mentioned above, may be applied to various articles. The authentication medium label 51 may be applied at the adhesive layer 52 to an article that is an application side, and the authentication medium transfer sheet 53 may be applied at the adhesive layer 52 to an article that is an application member after the releasable substrate 54 is released off.

Figure 12A:
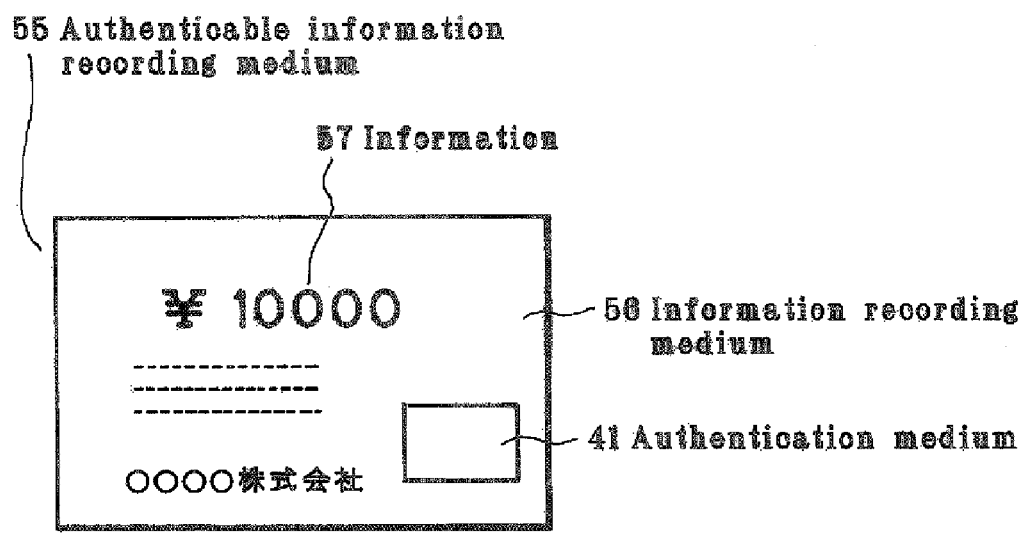
FIG. 12 is illustrative of an example of application of another authentication medium according to the present invention.

FIG. 12 is illustrative of one exemplary application of the authentication medium 41 to be used primarily with a sheet form of article. What is illustrated in FIG. 12(a) is an authenticable information-recording medium 55 wherein the authentication medium 41 is stacked on a part of the surface of an information-recording medium 56. The information-recording medium 56 is configured in a sheet form that is made up of a paper, plastic sheet or other substrate. In the embodiment illustrated, the information-recording medium 56 has information 57 recorded on it as by printing, said information including an amount of money available as a tradable coupon, the name of an issuer, instructions, patterns, etc.

Figure 12B:
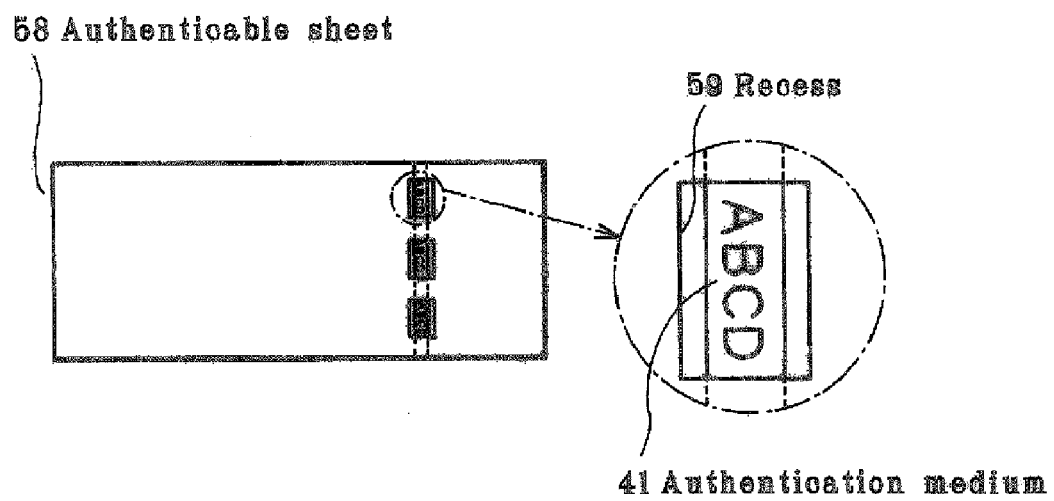

What is depicted in FIG. 12(b) is an authentication medium 41 previously incorporated in a sheet form of article in a visible way. The sheet-like article made up of paper, a plastic sheet or the like is provided with a recess 59 that is not in a through-hole form, and through which the authentication medium 41 is seen. As an example, the authentication medium 41 is chopped into an elongate thread form having a very narrow width of about 0.5 mm to about 5 mm for the purpose of facilitating its application. When the sheet-like article is paper, the recess 59 is provided in the surface layer of some layers constituting paper, and the thread-like authentication medium 41 is interleaved or otherwise inserted between the remaining paper layers. To enhance the visibility of the thread-like authentication medium 41 at the time of irradiation with circularly polarized light, it is often preferable that one surface of the substrate, etc. is colored in a dark or like color, and to make sure adhesion between the thread-like authentication medium 41 and the sheet-like article in a state of the former being incorporated in the latter, it is preferable that an adhesive layer, preferably a heat-sensitive adhesive layer is stacked on one or each surface of the substrate. Such a sheet-like article to which the authentication medium 41 is applied is best suited for use with information-recording media, especially tradable coupons and other printed matter having economical values.

Example 7

A polymerizable cholesteric liquid crystal solution (A) was gravure printed on the surface of a 50 μm thick PET film, then dried, and finally irradiated with ultraviolet radiation to form a 2.2 μm thick cholesteric liquid crystal layer (A) all over the surface. Another polymerizable cholesteric liquid crystal solution (B) was gravure printed on the surface of the PET film that faced away from the cholesteric liquid crystal layer (A), then dried, and finally irradiated with ultraviolet radiation to form a 2.2 μm thick cholesteric liquid crystal layer (B) all over the surface.

The polymerizable cholesteric liquid crystal solution (A) used here was a 20% solution containing a polymerizable nematic liquid crystal ("Palio Color LC242" made by BASF), a chiral agent ("Palio Color LC756" made by BASF) and an ultraviolet polymerization initiator with toluene as a solvent. The polymerizable nematic liquid crystal/chiral agent blend ratio was 95.3/4.7, and the content of the ultraviolet polymerization initiator was 5% relative to the polymerizable nematic liquid crystal. The polymerizable cholesteric liquid crystal solution (B) was the same as the polymerizable cholesteric liquid crystal solution (A) with the exception that the polymerizable nematic liquid crystal/chiral agent blend ratio was 96.2/3.8

A transparent ultraviolet curable resin composition was coated on the cholesteric liquid crystal layer (B) side of the obtained composite film having a multilayer structure of cholesteric liquid crystal layer (A)/PET film/cholesteric liquid crystal layer (B), and brought into contact with the surface of a relief hologram-copying mold. In that state, the assembly was irradiated with ultraviolet radiation to cure the transparent ultraviolet curable resin composition to form a relief hologram. Thereafter, $TiO_2$ was vacuum vapor deposited on the surface with the relief hologram given to it to form a transparent reflective layer of 500 nm in thickness, thereby obtaining an authentication medium.

As the obtained authentication medium was viewed from the cholesteric liquid crystal layer (A) side at varying angles, it was found that there was a change in the color resulting from the cholesteric liquid crystal layer. As a right-handed circularly polarizing sheet was put over the cholesteric liquid crystal layer (A) side of the authentication medium, the whole was seen in green, and upon changing from the right-handed to a left-handed circularly polarizing sheet, the whole was seen in red, indicating that authentication was well achievable.

Example 8

A polymerizable nematic liquid crystal solution was gravure coated on the surface of a 38 μm thick PET film, then dried, and finally irradiated with ultraviolet radiation to form a 1.0 μm thick nematic liquid crystal layer. The polymerizable nematic liquid crystal solution used here was a 15% solution containing a polymerizable nematic liquid crystal ("Palio Color LC242" made by BASF) and an ultraviolet polymerization initiator with toluene and cyclohexanone as solvents. The content of the ultraviolet polymerization initiator was 5% relative to the polymerizable nematic liquid crystal. Example 7 was repeated with the exception that the thus obtained nematic liquid crystal layer/PET film multilayer structure was used in place of the PET film in Example 7, thereby obtaining an authentication medium.

As the obtained authentication medium was viewed from the cholesteric liquid crystal layer (A) side at varying angles, it was found that there was a change in the color resulting from the cholesteric liquid crystal layer. As a right-handed circularly polarizing sheet was put over the cholesteric liquid crystal layer (A) side of the authentication medium, the whole was seen in green, and upon changing from the right-handed to a left-handed circularly polarizing sheet, the whole was seen in red, indicating that authentication was well achievable.

Example 9

A PVA solution (a 5% aqueous solution (transparent) of PVA Resin made by Kuraray Co., Ltd.: Product No. 110) was coated and dried on the surface of a 75 μm thick TAC film, and then rubbed to form an orientation film. A 1.5 μm thick nematic liquid crystal layer was formed on the orientation film as in Example 8, and a 2.2 μm thick cholesteric liquid crystal layer (A) was formed all over the surface of the nematic liquid crystal layer as in Example 7.

As in Example 7, a relief hologram and a 500 nm thick transparent reflective layer were formed in this order on an exposed surface side of the TAC film in the thus obtained composite film having a multilayer structure of cholesteric liquid crystal layer (A)/orientation film/TAC film, thereby obtaining an authentication medium with a relief hologram and a 500 nm thick transparent reflective layer formed in this order.

As the obtained authentication medium was viewed from the cholesteric liquid crystal layer (A) side at varying angles, it was found that there was a change in the color resulting from the cholesteric liquid crystal layer. As a right-handed circularly polarizing sheet was put over the cholesteric liquid crystal layer (A) side of the authentication medium, the whole was seen in green, and upon changing from the right-handed to a left-handed circularly polarizing sheet, the whole was seen in red, indicating that authentication was well achievable.

Yet another authentication medium 61 of the present invention comprises a multilayer structure wherein, as depicted in FIG. 13(a), an orientation film 63 and a light selective reflecting pattern layer 64 are stacked in this order on the upper surface of a substrate 62 and a hologram-formation layer 65 as a light diffracting structure layer is stacked on the lower surface of the substrate 62, with a reflective layer (also called a light reflective layer) 66 stacked on the lower surface of the hologram-formation layer 65. The hologram-formation layer 66 has a fine relief hologram pattern along which the reflective layer 66 is stacked. In the embodiment here, the substrate 62 is located between the light selective reflecting pattern layer 64 and the hologram-formation layer 65 plus the reflective layer 66, so that the pattern layer 62 has no or little influence on the hologram-formation layer 65 and the reflective layer 66, and vice versa, at the time when they are formed.

Alternatively, as depicted in FIG. 13(b), the authentication medium 61 of the present invention may have a multilayer structure wherein on the lower surface of a substrate 62, there may be an orientation film 63, a light selective reflecting pattern layer 64, a hologram-formation layer 65 and a reflective layer 66 stacked in this order. Again, the hologram-formation layer 65 has a fine relief hologram pattern on its lower surface side, along which the reflective layer 66 is formed. With the respective layers stacked on one side alone of the substrate, the substrate 62 with its upper surface remaining exposed may be used as a protective layer.

In the two embodiments here, each light selective reflecting pattern layer 64 is a layer made up of a material able to selectively reflect either one of left-handed or right-handed circularly polarized light of incident light, for instance, a cholesteric liquid crystal layer with a pattern formed depending on the presence or absence, or the thickness, of the layer. The reflective layer 66, for instance, is built up of a metal thin film or the like.

In the embodiments explained with reference to FIG. 13, each light selective reflecting pattern 64 may be constructed of two types of light selective reflecting pattern layers, an identical material having different thicknesses, or different materials. Further, one of the two types of light selective reflecting pattern layers may be in a uniform layer form.

In the embodiments explained with reference to FIG. 13, the orientation film 63 separate from the substrate 62 is needed; however, when a stretched plastic sheet is used as the substrate 62, it may be dispensed with because of its own orientation capability.

For the substrate 62, it is preferable to use a material that can be made thin, and has mechanical strength as well as solvent and heat resistance well capable of standing up to a processing operation for the fabrication of the authentication medium 61. Depending on purpose but not by way of limitation, preference is given to a film or sheet form of plastic material. Specific mention is made of various plastic films such as those based on polyethylene terephthalate (PET), polycarbonate, polyvinyl alcohol, polysulfone, polyethylene, polypropylene, polystyrene, polyarylate, triacetyl cellulose (TAC), diacetyl cellulose, and polyethylene/vinyl alcohol.

The orientation film 63 may be formed of any desired material such as polyvinyl alcohol resins (PVA) and polyimide resins provided that it can be used as a general orientation film. Usually, the orientation film 63 is formed by coating a solution of these resins in a solvent on the surface of such a substrate 62 as mentioned above by means of a suitable coating technique, followed by drying, and rubbing with cloth, a brush or the like. When two or more light selective reflecting pattern layers are provided, an orientation film interleaved, if necessary, between the light selective reflecting pattern layers, too, may similarly be formed.

The light selective reflecting pattern layer 64 is composed of a cholesteric liquid crystal layer. The cholesteric liquid crystal layer in an oriented state has the nature of reflecting only one of left-handed or right-handed circularly polarized light of incident light. The light selective reflecting pattern layer 64 may be formed by the application and drying in a pattern form of a solution of cholesteric liquid crystals in a solvent. Alternatively, it may be formed by the application and drying in a pattern form of an ultraviolet polymerizable composition comprising a polymerizable cholesteric liquid crystal, followed by irradiation with ultraviolet radiation for polymerization.

When the light selective reflecting pattern layer 64 is provided in a pattern form, it is preferable to make use of various printing techniques. When two or more light selective reflecting pattern layers 64 are provided and at least one of them is formed as a uniform layer, it is preferable to make use of various coating techniques.

The hologram-formation layer 65 has a fine relief pattern of relief hologram formed on one surface of a layer made up of a transparent resin material.

For the transparent resin material for building up the hologram-formation layer 65, a variety of thermoplastic resins, thermosetting resins or ionizing radiation curable resins may be used. The thermoplastic resins include acrylic ester resins, acrylamide resins, nitrocellulose resins, polystyrene resins or the like; and the thermosetting resins include unsaturated polyester resins, acrylic urethane resins, epoxy-modified acrylic resins, epoxy-modified unsaturated polyester resins, alkyd resins, phenol resins or the like. Those thermoplastic resins and thermosetting resins may be used alone or in combination of two or mores. One or two or more of such resins may be crosslinked by way of various isocyanate resins, or may be blended with various curing catalysts such as metal soaps, for instance, cobalt or zinc naphthenate, or thermal or ultraviolet polymerization initiators such as peroxides represented by benzoyl peroxide and methyl ethyl ketone peroxide, benzophenone, acetophenone, anthraquinone, naphthoquinone, azobis-isobutyronitrile or diphenyl sulfide. The ionizing radiation curable resins include epoxy acrylate, urethane acrylate, acrylic-modified polyester or the like. It is acceptable to introduce a crosslinked structure in those ionizing radiation curable resins or blend with them mono- or poly-functional monomers, oligomers, etc. for the purpose of viscosity adjustment.

The hologram-formation layer 65 may be formed directly from that resin material by subjecting a photo-sensitive resin material to holographic interference exposure, followed by development; however, it is preferable that a copying mold such as a previously formed relief hologram or its replica, or their plating mold is pressed at its surface against the aforesaid resin material for copying. When the thermosetting resin or the ionizing radiation curable resin is used, an uncured resin is cured by heating or irradiation with ionizing radiation while it is in tight contact with the surface of the mold. After curing, the resin is released off to form a fine relief pattern of relief hologram on one surface of the cured transparent resin material layer. Note here that a diffraction grating-formation layer having a pattern form of diffraction grating formed in similar manners, too, may be used as the light diffraction structure.

The reflective layer 66 formed along the fine relief pattern of relief hologram may be either a reflective metal thin film or a transparent layer having a refractive index different from that of the hologram-formation layer 65. The use of the former gives an opaque hologram, whereas the use of the latter gives a transparent hologram. In either case, there is a reflection hologram obtained, which is improved in visibility as viewed under illumination from the viewer side.

The material for the formation of the reflective metal thin film includes metals such as Al, Cr, Ti, Fe, Co, Ni, Cu, Ag, Au, Ge, Mg, Sb, Pb, Cd, Bi, Sn, Se, In, Ga, and Rb, or their oxides or nitrides. The reflective metal thin film may also be formed of one or two or more of such materials. Among others, particular preference is given to Al, Cr, Ni, Ag, and Au, with a film thickness of preferably 1 nm to 10,000 nm, and more preferably 2 nm to 200 nm.

For the material for constituting the transparent layer having a refractive index different from that of the hologram-formation layer 65, there is a transparent material having a refractive index different from that of the resin material for the hologram-formation layer. The refractive index of that transparent material may be either larger or smaller than that of the resin of the hologram-formation layer; however, it is desired that there be a refractive index difference of preferably at least 0.1, more preferably at least 0.5, and even more preferably at least 1.0. Specifically, titanium oxide ($TiO_2$), zinc sulfide (ZnS), a Cu.Al composite metal oxide and so on are preferred Note here that a metal thin film of less than 20 nm in thickness, too, may be used as the material for constituting the transparent layer having a refractive index different from that of the hologram-formation layer 65, because of having transparency.

No matter what the reflective layer 66 is formed of, it may be provided by means of known techniques such as sublimation, vacuum vapor deposition, sputtering, reactive sputtering, ion plating, and electroplating.

How to implement authentication is now explained specifically with reference to the authentication medium 61 described referring to FIG. 13(a). As the authentication medium 61 of the present invention is viewed under natural light, a hologram 67 recorded as a fine relief pattern on the lower surface of the hologram-formation layer 65 can be seen by way of the reflection of light off the reflective layer 66, as shown schematically in FIG. 14(a). At this time, the light selective reflecting pattern layer 64 is transparent, but the authentication medium 61 is seen in different colors depending on the angle of viewing, say, it looks like a colored image 68' as depicted in FIG. 14(b). Assume here that the light selective reflecting pattern layer 64 is a layer made up of a material able to selectively reflect right-handed circularly polarized light. Then, as left-handed circularly polarized light enters the light selective reflecting pattern layer 64, left-handed circularly polarized light is not reflected, so the hologram 67 alone is seen without the image of a capital "A" being visualized, as depicted in FIG. 14(c).

With the authentication medium 61 described with reference to FIG. 13(b), too, authentication may be implemented as explained above.

Thus, the authentication medium 61 of the present invention having a multilayer structure comprising the light selective reflecting pattern 64 and the hologram-formation layer 65 differs in reflectance depending on the angle of viewing or by entering left-handed circularly polarized light in it, so that the viewer can see the authentication medium 61 in different ways. Therefore, by making sure how a genuine article is seen or entering left-handed circularly polarized light in both a genuine article and the article to be authenticated to compare them in terms of reflectance or what is seen, authentication may be implemented. It is here noted that to view the authentication medium with entrance of left-handed circularly polarized light in the light selective reflecting pattern layer 64, it is only needed to put a left-handed circularly polarizing sheet over the light selective reflecting pattern 64.

If the authentication medium 61 of the present invention described with reference to FIG. 13 is configured or otherwise processed into a label or transfer sheet form, as will be explained with reference to FIG. 15, then it can more easily be applied to various articles.

FIG. 15(a) shows a label form. In the embodiment shown, an authentication medium 71 is built up by stacking an adhesive layer 72 on the reflective layer 66 side of an authentication medium 61 having a multilayer structure wherein a substrate 62, a light selective reflecting pattern layer 64, a hologram-formation layer 65 and a reflective layer 66 are stacked together in this order. For the authentication medium 61 for building up the authentication medium 71, not only the above multilayer structure but also each multilayer structure described with reference to FIG. 13, with or without the orientation film 63, may be used.

The stacking of the adhesive layer 72 on the reflective layer 66 side is more preferable for authentication purposes, as explained with reference to FIG. 15(a); however, it is sometime possible to stack the adhesive layer on the substrate 62 side. On which side of the authentication medium 61 the adhesive layer is to be stacked is determined depending on which of the reflective layer 66 side or the substrate 62 side defines an entrance surface when the label is applied to an article. When the reflective layer 66 is made up of a reflective metal thin film (except a transparent one), the substrate 62 side defines the entrance surface. To make the latent image visible at the time when the authentication medium 61 is built up of a material that must have the orientation film 63, like a triacetyl cellulose film, right-handed or left-handed circularly polarized light may be entered from either the reflective layer 66 side or the substrate 62 side. However, when the authentication medium 62 is built up of a substrate that has its own surface orientation capability and so does not have to have any orientation film, like a polyethylene terephthalate or polycarbonate resin film, it is necessary to enter right-handed or left-handed circularly polarized light from the reflective layer 66 side. Note here that the adhesive layer 72 may be selected from various types of adhesive layers, but preference is given to a heat- or pressure-sensitive adhesive layer.

FIG. 15(b) shows a transfer sheet form. In the embodiment illustrated, an authentication medium transfer sheet 73 is built up by stacking an adhesive layer 72 on the reflective layer 66 side of an authentication medium 61 having a multilayer structure wherein a substrate 62, a light selective reflecting pattern layer 64, a hologram-formation layer 65 and a reflective layer 66 are stacked together in this order, and stacking the releasable surface 74a side of a releasable substrate 74 on the substrate 62 side. For the authentication medium 61 for building up the authentication medium transfer sheet 73, just only the above multilayer structure but also each multilayer structure described with reference to FIG. 13, with or without the orientation film 63, may be used.

With the authentication medium transfer sheet 73, too, which side of the authentication medium 61 the adhesive layer is to be stacked on is determined depending on which of the reflective layer 66 side or the substrate 62 side defines an entrance surface at the time when the transfer sheet is applied to a variety of articles, as is the case with the authentication medium label 71, and the releasable substrate 74 is stacked on the side that faces away from the adhesive layer 72. Again, the adhesive layer 72 may be selected from various types of adhesive layers, but preference is given to a heat- or pressure-sensitive adhesive layer. Note here that the adhesive layer is applied to the surfaces of various articles to which the authentication medium 61 is to be applied, and there may be a transfer sheet built up with no adhesive layer.

For the purpose of enhancing the effect of light reflected off the pattern of the light selective reflecting pattern layer 64 in the authentication medium 61 of the present invention being seen in different colors depending on the angle of viewing and/or for the purpose of enhancing the visibility of the hologram based on the lower hologram-formation layer 65 or reflective layer 5, it is preferable that a dark color layer such as a resin layer colored in black or like color is provided below each layer. When the adhesive layer 72 is provided as a lower layer as explained with reference to FIG. 15, a dark color layer may be interleaved between the reflective layer 66 and the adhesive layer 72 or, alternatively, a dark color adhesive layer colored in black or like color may be used to provide the adhesive layer 72 instead of using another dark color layer.

The authentication medium 61 of the present invention, preferably in the form of the authentication medium label 71 or the authentication medium transfer sheet 73 as mentioned above, may be applied to various articles. The authentication medium label 71 may be applied at the adhesive layer 72 to an article that is an application side, and the authentication medium transfer sheet 73 may be applied at the adhesive layer 72 to an article that is an application member after the releasable substrate 74 is released off.

FIG. 16 is illustrative of one exemplary application of the authentication medium 61 to be used primarily with a sheet form of article. What is illustrated in FIG. 16(a) is an authenticable information-recording medium 75 wherein the authentication medium 61 is stacked on a part of the surface of an information-recording medium 76. The information-recording medium 76 is configured in a sheet form that is made up of a paper, plastic sheet or other substrate. In the embodiment illustrated, the information-recording medium 76 has information 77 recorded on it as by printing, said information including an amount of money available as a tradable coupon, the name of an issuer, instructions, patterns, etc.

What is depicted in FIG. 16(b) is an authentication medium 61 previously incorporated in a sheet form of article in a visible way. The sheet-like article made up of paper, a plastic sheet or the like is provided with a recess 79 that is not in a through-hole form, and through which the authentication medium 61 is seen. As an example, the authentication medium 61 is chopped into an elongate thread form having a very narrow width of about 0.5 mm to about 5 mm for the purpose of facilitating its application. When the sheet-like article is paper, the recess 79 is provided in the surface layer of some layers constituting paper, and the thread-like authentication medium 61 is interleaved or otherwise inserted between the remaining paper layers. To enhance the visibility of the thread-like authentication medium 61 at the time of irradiation with circularly polarized light, it is often preferable that one surface of the substrate, etc. is colored in a dark or like colors and to make sure adhesion between the thread-like authentication medium 61 and the sheet-like article in a state of the former being incorporated in the latter, it is preferable that an adhesive layer, preferably a heat-sensitive adhesive layer is stacked on one or each surface of the substrate. Such a sheet-like article to which the authentication medium 61 is applied is best suited for use with information-recording media, especially tradable coupons and other printed matter having economical values.

Example 10

A polymerizable cholesteric liquid crystal ink was gravure printed on the surface of a PET film, then dried, and finally irradiated with ultraviolet radiation to obtain a printed film with a character-and-pattern formed on it. The polymerizable cholesteric liquid crystal ink used here was a 40% solution containing a polymerizable nematic liquid crystal ("Palio Color LC242" made by BASF), a chiral agent ("Palio Color LC756" made by BASF) and an ultraviolet polymerization initiator with toluene as a solvent. The polymerizable nematic liquid crystal/chiral agent blend ratio was 95.5/4.5, and the content of the ultraviolet polymerization initiator was 5% relative to the polymerizable nematic liquid crystal.

A transparent ultraviolet curable resin composition was coated on the unprinted surface of the printed film, and brought into contact with the surface of a relief hologram-copying mold. In that state, the assembly was irradiated with ultraviolet radiation to cure the transparent ultraviolet curable resin composition to form a relief hologram. Thereafter, ZnS was vacuum vapor deposited on the surface with the relief hologram given to it to form a transparent reflective layer of 400 nm in thickness, thereby obtaining an authentication medium.

As the obtained authentication medium was viewed from the reflective layer side, the hologram, and the printed character-and-pattern was seen, and the printed character-and-pattern varied in hue depending on the angle of viewing the authentication medium. As a left-handed circularly polarizing sheet was put over, the hologram alone was seen; the printed character-and-pattern was out of sight, indicating that authentication was well achievable.

Example 11

An authentication medium was obtained as in Example 10 with the exception that characters and a pattern, a relief hologram, and a reflective layer were formed on the same side of a PET film. As the obtained authentication medium was viewed from the reflective layer side, the hologram, and the printed character-and-pattern was seen, and the printed character-and-pattern varied in hue depending on the angle of viewing the authentication medium. As a left-handed circularly polarizing sheet was put over, the hologram alone was seen; the printed character-and-pattern was out of sight, indicating that authentication was well achievable.

Example 12

As in Example 10, a character-and-pattern was formed on the surface of a PET film, after which another polymerizable cholesteric liquid crystal ink was applied on that surface to form another character-and-pattern, thereby obtaining a printed film with two character-and-pattern combinations formed on it. The aforesaid another polymerizable Cholesteric liquid crystal ink was similar to the one used in Example 10 except that the polymerizable nametic liquid crystal/chiral agent blend ratio was 96.2/3.8. Finally, a relief hologram and a reflective layer were formed in this order on the unprinted surface of the resultant printed film as in Example 10, thereby obtaining an authentication medium.

As the obtained authentication medium was viewed from the reflective layer side, the hologram, and the two character-and-pattern combinations were seen, and the two character-and-pattern combinations varied in hue depending on the angle of viewing the authentication medium. As a left-handed circularly polarizing sheet was put over, the hologram alone was seen; the printed character-and-pattern combinations were out of sight, indicating that authentication was well achievable.

What we claim is:

1. An authentication medium, characterized by comprising a multilayer structure in which two light selective reflecting layer are stacked together with a phase difference layer interleaved therebetween, wherein said two light selective reflecting layers are each formed of a material capable of selectively reflecting either one of left-handed or right-handed circularly polarized light of incident light, and center wavelengths of light reflected off said two light selective reflecting layers differ from each other.

2. The authentication medium according to claim 1, characterized in that said phase difference layer is a transparent substrate film.

3. The authentication medium according to claim 1, characterized in that said phase difference layer is a multilayer structure comprising a transparent film and a nematic liquid crystal layer.

4. The authentication medium according to claim 1 characterized in that a light diffracting structure layer is stacked on one surface of said multilayer structure.

5. The authentication medium according to claim 4, characterized in that said light diffracting structure layer is a reflection hologram.

6. The authentication medium according to claim 4, characterized in that said light diffracting structure layer has a light reflective layer in association therewith.

7. An authentication medium label, characterized in that an adhesive layer is further stacked on the authentication medium according to claim 1.

8. An authentication medium transfer sheet, characterized in that the authentication medium according to claim 1 is stacked on a releasable surface of a releasable substrate.

9. An authenticable sheet, characterized by having the authentication medium according to claim 1 on a part thereof in a visible way.

10. An authenticable information recording medium, characterized in that the authentication medium according to claim 1 is stacked on a surface of an information recording medium to be authenticated, or said information recording medium has an authentication medium according to claim 1 on a part thereof in a visible way.

11. An authentication medium, characterized in that a light selective reflecting pattern layer comprising a layer of a material having light selective reflectivity capable of reflecting either left-handed or right-handed circularly polarized light of incident light, and a light diffracting structure layer with a light reflective layer are stacked together with a phase difference layer interleaved between them.

12. The authentication medium according to claim 11, characterized in that said light selective reflecting pattern layer is stacked on one surface side of a transparent substrate, and said light diffracting structure layer is stacked on another side surface of said transparent substrate.

13. The authentication medium according to claim 11, characterized in that said light selective reflecting pattern layer and said light diffracting structure layer are stacked on one surface side of a transparent substrate.

14. The authentication medium according to claim 11, characterized in that said light diffracting structure layer is a reflection hologram.

15. An authentication medium label, characterized in that an adhesive layer is further stacked on the authentication medium according to claim 11.

16. An authentication medium transfer sheet, characterized in that the authentication medium according to claim 11 is stacked on a releasable surface of a releasable substrate.

17. An authenticable sheet, characterized by having the authentication medium according to claim 11 on a part thereof in a visible way.

18. An authenticable information recording medium, characterized in that the authentication medium according to claim 11 is stacked on a surface of an information recording medium to be authenticated, or said information recording medium has the authentication medium according to claim 11 on a part thereof in a visible way.

* * * * *